(12) United States Patent
Pauli et al.

(10) Patent No.: US 7,231,183 B2
(45) Date of Patent: Jun. 12, 2007

(54) QUALITY DETERMINATION FOR A WIRELESS COMMUNICATIONS LINK

(75) Inventors: Mathias Pauli, Nuremberg (DE); Udo Wachsmann, Schwabach (DE); Shiau-He (Shawn) Tsai, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 597 days.

(21) Appl. No.: 10/682,280

(22) Filed: Oct. 9, 2003

(65) Prior Publication Data

US 2004/0219883 A1 Nov. 4, 2004

(30) Foreign Application Priority Data

Apr. 29, 2003 (EP) .................................. 03009630

(51) Int. Cl.
*H04B 17/00* (2006.01)
(52) U.S. Cl. .................. 455/67.11; 455/63.1; 455/423; 370/232; 370/334
(58) Field of Classification Search ................ 455/423, 455/67.11, 9, 450, 63.1; 370/232, 334
See application file for complete search history.

(56) References Cited

U.S. PATENT DOCUMENTS

| | | | |
|---|---|---|---|
| 5,351,274 A | 9/1994 | Chennakeshu et al. | |
| 7,016,670 B2 * | 3/2006 | Agin | 455/423 |
| 7,020,110 B2 * | 3/2006 | Walton et al. | 370/334 |
| 7,054,643 B2 * | 5/2006 | Trossen et al. | 455/454 |
| 2001/0044915 A1 | 11/2001 | Rotain et al. | |
| 2002/0068560 A1 | 6/2002 | Agin | |
| 2002/0099985 A1 | 7/2002 | Cheng | |
| 2004/0121794 A1 * | 6/2004 | Koo et al. | 455/522 |

OTHER PUBLICATIONS

European Patent Office, International Search Report for PCT/EP2004/004575 dated Aug. 16, 2004.
Jung-Fu Cheng, "Turbo decoder assisted frame error rate estimation", VTC Fall 2001, IEEE 54th Vehicular Technology Conference, Proceedings, Atlantic City, NJ, Oct. 7-11, 2001.

* cited by examiner

*Primary Examiner*—Sanh D. Phu
(74) *Attorney, Agent, or Firm*—Roger S. Burleigh

(57) ABSTRACT

A method and a receiver for determining the quality of a wireless communications link are described. The link quality is determined on the basis of an encoded signal that is transmitted via the communications link and that includes at least two signal portions experiencing different states of one or more transmission channels. The method comprises the steps of providing individual channel quality values for the different channels and determining a quality measure indicative of the link quality by averaging the individual channel quality values in the exponential domain.

26 Claims, 28 Drawing Sheets

| Modulation Scheme | $\gamma_{mod}$ [dB] |
|---|---|
| BPSK | 0 |
| QPSK | 3 |
| 16QAM | $\approx 8$ |

Fig. 8

| MCS | Code | Modulation Scheme | $\gamma_{mod}$ [dB] | $\gamma_{cod}$ [dB] |
| --- | --- | --- | --- | --- |
| 1 | TC R=1/3 | BPSK | 0 | -1 |
| 7 | TC R=1/3 | QPSK | 3 | -1 |
| 9 | TC R=1/3 | 16QAM | 8 | -2 |
| 8 | TC R=1/2 | BPSK | 0 | -1 |
| 12 | TC R=1/2 | QPSK | 3 | -1 |
| 5 | TC R=4/5 | QPSK | 3 | -0.45 |
| 3 | CC R=1/8 | QPSK | 3 | -0.3 |
| 13 | CC R=1/3 | BPSK | 0 | -0.6 |
| 2 | CC R=1/3 | QPSK | 3 | -0.6 |
| 10 | CC R=1/3 | 16QAM | 8 | 0.6 |
| 11 | CC R=1/2 | BPSK | 0 | -0.4 |
| 4 | CC R=1/2 | QPSK | 3 | -0.4 |
| 6 | CC R=1/2 | 16QAM | 8 | +1.5 |

Fig. 11

| Channel | Number of States | ΔSNR [dB] |
|---|---|---|
| MS1 | 16 | 1.8 |
| MS2 | 4 | 6 |
| MS3 | 256 | 0.08 |
| MS4 | 27 | 0.8 |
| MS5 | 2 | 1 |
| MS6 | 2 | 5 |
| MS7 | 2 | 10 |
| MS8 | 4 | 1 |
| MS9 | 4 | 3 |
| MS10 | 9 | 0.1 |
| MS11 | 9 | 1 |
| MS12 | 9 | 3 |
| MS13 | 9 | 5 |
| MS14 | 270 | 0.07 |

Fig. 12

QUALITY DETERMINATION FOR A WIRELESS COMMUNICATIONS LINK

CROSS-REFERENCE TO RELATED APPLICATIONS

This application claims the benefit of the filing date as provided by 35 U.S.C. 119 of a European Patent application number 03009630-9 filed on Apr. 29, 2003, the disclosure of which is incorporated herein by reference.

FIELD OF THE INVENTION

The present invention generally relates to signal transmissions in a wireless communications environment. More specifically, the invention relates to the quality determination of communications links that are used to transmit encoded signals.

BACKGROUND

In adaptive communications systems like UMTS, EDGE, or the 5 GHz WLAN systems (IEEE 802.11a, HiperLAN2, and HisWANa), transmission parameters like transmit power, code rate, and/or modulation scheme are adapted to the instantaneous conditions of communications links and, in particular, to channel conditions in order to make efficient use of the available resources. One key ingredient in these adaptation schemes is the so-called channel quality information (CQI) or communications link quality measurement (LQM), respectively. CQI or LQM stand for an assessment of link parameters (e.g., a signal-to-noise ratio (SNR), multipath tap weights, etc.)

A specific problem of CQI is the error-rate prediction for signal transmissions via multi-state communications links, e.g. coded transmissions over multi-state channels. The expression multi-state means that during the transmission of a signal or portions thereof (e.g. one code word) using a specific modulation and coding scheme (MCS), the communications link or channel state is varying. In the case of the instantaneous SNR or signal-to-interference ratio (SIR), this can be formally expressed by:

$$y_k = \sqrt{SNR_k} \cdot x_k + z_k, \quad k=1, \ldots, N, \qquad 1.1$$

wherein $SNR_k$ denotes the communications link SNR (channel state), which is experienced at instance k, and N is the number of considered signal portions per transmitted signal (e.g. the number symbols per code word). Here, the mean power of signal portions (code symbols) $x_k$ and noise samples $z_k$ are assumed to be equal to one.

There are numerous examples where these multi-state communications links appear. Three frequent situations shall be briefly mentioned in the following:

Transmission over time-selective, frequency-selective, and space-selective channels.

An example for the transmission over a time-selective communications link is the physical layer transmission of UMTS. In general, the 5 MHz bandwidth of UMTS also leads to a frequency-selective channel. The information is encoded in the time domain and organized such that the incoming information is grouped, coded, and transmitted in so-called transmission time intervals (TTIs) of variable lengths (e.g. 10, 20, 40 or 80 ms).

One TTI directly corresponds to one code word. The received TTI symbols or soft bits after Rake combination are taken as decoder input. The channel SNR, or equivalently the channel state, experienced by these symbols is in general varying over time. The degree of variation depends on the vehicular speed.

One example for the time selectivity of a UMTS channel is depicted in FIG. 1. This is one snapshot for a vehicular speed of 120 km/h at a carrier frequency of 2 GHz assuming flat fading. The circles mark the beginning of the so-called slots, the length of which is 10/15 ms. The SNR values corresponding to the depicted circles may constitute the channel states $SNR_k$. It should be noted that the SNR values are normalized such that the mean value equals one (0 dB).

OFDM transmission is an example for transmission over a frequency-selective channel. IEEE802.11a can be mentioned as one of the various systems applying OFDM. In OFDM, the information is encoded and mapped onto frequency subcarriers. Usually, it is applied in scenarios with large delay spreads with respect to the inverse transmission bandwidth, which means to have a frequency-selective channel over the transmission bandwidth. Therefore, the received subcarrier symbols after demodulation have in general experienced different fading amplitudes. The degree of subcarrier fading depends on the delay spread and the tap weights of the instantaneous channel impulse response.

One example for the frequency selectivity of a IEEE802.11a channel is depicted in FIG. 2. This is one snapshot for an rms delay spread of 150 ns, which is the assumption for the channel model C used in the IEEE802.11a standardization process. The IEEE802.11a channel bandwidth is 20 MHz and the band is divided into 64 subchannels. The circles mark the location of the individual subcarriers. The SNR values per subcarrier typically constitute the channel states $SNR_k$. Again, the SNR values are normalized such that the mean value equals one.

MIMO transmission schemes of the BLAST-type may be mentioned as one example for a space-selective channel. Thereby, the (potentially physically available) parallel MIMO channels are fed by parallel transmit streams or layers. These layers may be encoded in common by one code and spatially multiplexed afterwards. The transmission over the MIMO channel results in interfering layers. Assuming a frequency-flat channel and applying a linear MMSE detector to the received signal vector in order to suppress the spatial interference, the symbol streams at the detector output, which are fed as soft bits to the decoder, experience in general different channel states in form of the detector output SNRs. This can be seen as channel varying over the space or the layers. The degree of variation depends mainly on the spatial correlation of the MIMO channel and also on the multipath profile.

One example for the space selectivity of a MIMO channel is depicted in FIG. 3. This is a typical snapshot for a flat and uncorrelated 4×4 MIMO channel. The transmit antenna streams or layers are separated at the receiver by means of a linear MMSE detector. The SNR plotted in the figure is the SNR at detector output. The SNR values per layer typically constitute the channel states $SNR_k$. The SNR values are normalized such that the mean value equals one.

In multi-state communications scenarios as those mentioned above there is a need for a method and a receiver that allow to accurately determine the quality of a wireless communications link.

SUMMARY

To satisfy this need, embodiments of the present invention provide a method of determining the quality of a wireless communications link on the basis of an encoded signal that is transmitted via the communications link and that includes at least two signal portions experiencing different states of one or more transmission channels. The method comprises the step of providing individual channel quality values for the different channel states and the step of determining a quality measure indicative of the link quality by averaging the individual channel quality values in the exponential domain.

Embodiments of the present invention may be used in various fields. It may for example be employed in context with error-rate estimation for coded transmissions over multi-state communications links. As has been mentioned before, the expression multi-state implies that during the duration of a signal transmission a channel state, e.g. the (instantaneous) signal-to-noise ratio (SNR) or signal-to-interference ration (SIR), is varying. This may originate from time-varying channel conditions, from frequency-selective conditions or from a space-selective behavior.

The problem of estimating (e.g. predicting) the error-rate arises in many applications such as channel quality measurement and, on the basis thereof, link quality assessment for link adaptation, power control, link-to-system interface modeling, verification of simulation results, etc. Embodiments of the present invention may serve as a basis for determining appropriate measures required in such applications.

The individual channel quality values may be provided in different ways. They may for example be obtained from (pedefined) pilot signals that are transmitted prior to the actual data transmission.

For averaging the individual channel quality values various mean value functions can be used. As examples, non-linear (e.g. logarithmic or non-logarithmic) or linear mean value functions can be mentioned. During averaging, the individual channel quality values may be weighted by individual probability measures. The probability measures may characterize the channel states.

Thus, the determination of the quality measure may be performed according to $$\gamma_{\it eff} = -\log e\left(\sum_{k=1}^{N} p_k \exp(-\gamma_k \cdot \alpha)\right) \cdot \beta$$

wherein
$\gamma_{\it eff}$ is the quality measure,
$\gamma_k$ are the individual channel quality values,
N is the number of signal portions included in the transmitted signal,
$p_k$ are probability measures for individual channel quality values and
$\alpha$ and $\beta$ are optional factors (that may equal 1).

At least one of the quality measure and the individual channel quality values may be adapted in dependence of the coding scheme and/or modulation scheme used for the encoded signal. For example a first correction term associated with a particular coding scheme can be used. The first correction term may be chosen such that a deviation of a quality measure determined for a reference communications link from a quality measure determined for an actual communications link is minimal for a target link quality (e.g. a frame error rate (FER) or a bit error rate (BER)). Alternatively or additionally, a second correction term associated with a particular modulation scheme used for transmitting the signal via the communications link can be employed. For instance, the second correction term may depend on the Euklidean distance differences of the chosen modulation scheme relative to the modulation scheme of binary phase shift keying (BPSK) or any other modulation scheme.

If one or more correction terms are to be used, the quality measure may be determined according to $$\gamma_{\it eff} = -\log e\left(\sum_{k=1}^{N} p_k \exp-\left(\frac{\gamma_k}{\gamma_{cod} * \gamma_{mod}}\right)\right) * \gamma_{cod} * \gamma_{mod},$$

wherein
$\gamma_{\it eff}$ is the quality measure,
$\gamma_k$ are the individual channel quality values,
N is the number of signal portions included in the transmitted signal,
$p_k$ are probability measures for individual channel quality values,
$\gamma_{cod}$ is the first correction term associated with a particular coding format, and
$\gamma_{mod}$ is the second correction term associated with a particular modulation scheme.

It should be noted that in the above formula $\gamma_{cod}$ or $\gamma_{mod}$ may equal 1.

A link quality parameter (e.g. an estimated FER or BER) for the communications link may be derived on the basis of the quality measure. The link quality parameter may be determined in various ways. For instance, it may be determined from a look-up table associating quality measures with link quality parameters. Alternatively, the link quality parameter may be determined in a calculation routine used to derive the link quality parameter from the quality measure.

The quality measure or a parameter derived therefrom may be transmitted back to a transmitter of the encoded signal. Thus, a control loop may be established, e.g. for link adaptation in dependence of the quality measure or the parameter derived therefrom. During link adaptation, the encoding scheme, the modulation scheme or the transmit power of signals to be transmitted via the communications link may be controlled. Power control may include a single power control loop or two or more nested power control loops. In the case of a single power control loop adapting the communications link may include an inner-loop power control that is based on the quality measure or the parameter derived therefrom, thus omitting an outer-loop power control for controlling a setpoint (e.g. a target link quality parameter) of the inner-loop power control.

The quality measure or a parameter derived therefrom may be used in context with allocating a transmit power to signal re-transmissions. Such re-transmission are for example performed when an incremental redundancy technique (like a packet-based hybrid ARQ technique) is implemented. Signal re-transmission need not necessarily be a strict repetition of the original signal. For example further redundancy may be included in the re-transmitted signal (as is the case in hybrid ARQ).

A further aspect of the invention relates to completely or partially replacing current transmission resources (i.e. individual frequencies, antennas, time slots etc.) if the quality measure or a parameter derived therefrom satisfies a predefined condition, i.e. is out of a predefined range or falls below a predefined threshold.

The individual channel quality values may be obtained for symbols of a code word transmitted by means of the signal, i.e. may be obtained symbol-based. The symbols may be OFDM symbols or parts thereof.

The individual channel quality values may relate to various parameters. They may for example be indicative of signal-to-noise ratios or signal-to-interference ratios or both.

Embodiments of the present invention may be implemented as software, as a hardware solution, or as a combination thereof. Thus, the invention also relates to a computer program product with program code portions for performing the individual steps of the invention when the computer program product is run on one or more computing units of the communication network. One or more of the computing units may be part of or co-located with a transcoder. The computer program product may be stored on a computer-readable recording medium.

As regards a hardware implementation, the invention relates to a receiver with a functionality for determining the quality of a wireless communications link that includes one or more transmission channels with two or more different channel states. The receiver comprises one or more components for providing individual channel quality values for the different channel states and for determining a quality measure indicative of the link quality by averaging the transmission quality values in the exponential domain. The receiver may further comprise a unit for generating a signal that includes the quality measure or a parameter derived therefrom and that is to be transmitted to a transmitter of the signal.

According to a further aspect, the invention relates to a communications environment that includes the receiver and a controller for adapting the communications link in dependence of the quality measure or a parameter derived therefrom. The controller may be arranged on the side of the receiver (e.g. incorporated in the receiver) or on the opposite side, i.e. on the side on which the encoded signal has been generated.

The controller may be configured to implement a power control scheme. In such a case the communications environment may further comprise a single (inner) power control loop which is based on a comparison of the quality measure or a parameter derived therefrom with a static target value (setpoint).

The controller may be configured to adapt the communications link on the basis of an estimation of an average signal power for signals to be transmitted via the communications link. Alternatively or additionally, the controller may be configured to select transmission resources completely or partially replacing the current transmission resources if the quality measure or a parameter derived therefrom satisfy a predefined condition, i.e. is out of a predefined range or falls below a predefined threshold.

It should be emphasized that embodiments of the present inventions may also be valuable for an efficient interface between link and system simulations. Additionally, the embodiments may serve as an easy-to-handle means for verifying link simulation results.

DESCRIPTION OF THE DRAWINGS

FIG. 8 is a table depicting suitable correction terms for various modulation schemes;

FIGS. 11 and 12 are tables illustrating various aspects of the invention;

DETAILED DESCRIPTION

Figure 1:
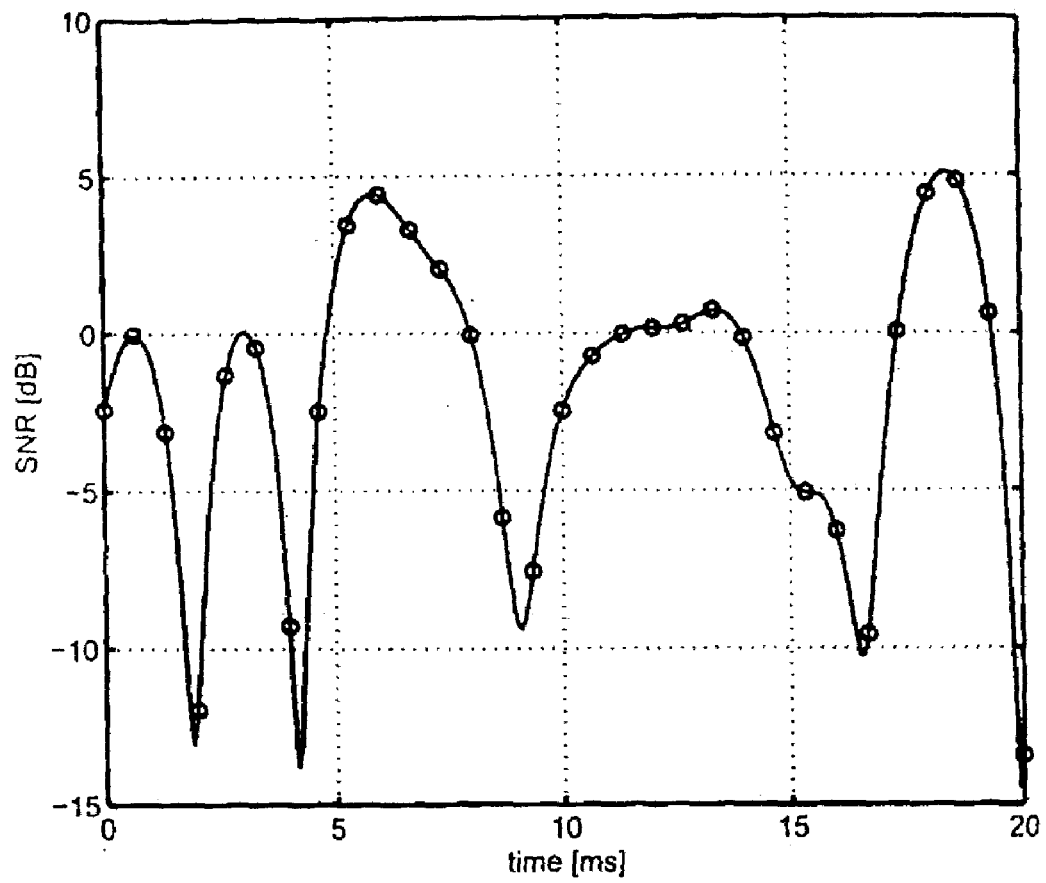
FIGS. 1 to 3 schematically illustrate different channel states.

In the following description, for purposes of explanation and not limitation, specific details are set forth, such as particular embodiments, signal formats, etc. in order to provide a thorough understanding of the present invention. It will be apparent to one skilled in the art that the present invention may be practiced in other embodiments that depart from these specific details. In particular, while the following embodiment is described herein below in context with an exemplary link quality estimation scheme, the present invention is not limited to such an implementation. It can be utilized in any wireless communications environment that requires a transmission quality determination. Moreover, those skilled in the art will appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs).

For the purposes of the present disclosure, various acronyms are used, these acronymns are listed below:

| | |
|---|---|
| ARQ | Automatic Repeat-reQuest. Error control for data transmission in which the receiver detects transmission errors in a message and automatically requests a retransmission from the transmitter. (Usually, when the transmitter receives the ARQ, the transmitter retransmits the message until it is either correctly received or the error persists beyond a predetermined number of retransmissions). |
| AWGN | Additive White Gaussian Noise. |
| BER | Bit Error Rate |
| BPSK | Binary Phase Shift Keying |
| CDMA | Code-Division Multiple Access |
| CQI | Channel Quality Information |
| EDGE | Enhanced Data GSM Environment - a 2.5 G technology that enhances GSM. EDGE increases transmission speeds on GSM networks and enables the transmission of large amounts of data at 384 Kbps. |
| ESM | Effective SNR Mapping |
| FER | Frame Error Rate |
| ICU | Interference Cancellation Unit |
| IR | Incremental Redundancy |
| LAU | Link Adaptation Unit |

-continued

| | |
|---|---|
| LQM | Link Quality Measurement |
| MCS | Modulation and Coding Scheme |
| MIMO | Multiple Input Multiple Output |
| MMSE | Minimum Mean Square Error |
| OFDM | Orthogonal Frequency Division Multiplex |
| PEP | Pairwise Error Probability |
| QMTU | Quality Measure Transmission Unit |
| RCU | Rake Combiner Unit |
| rms | root means square |
| SIR | Signal-to-Interference ratio |
| SNR | Signal-to-noise ratio |
| STU | Signal Transmission Unit |
| TDU | Transmission Quality Determination Unit |
| TTI | Transmission time interval |
| UMTS | Universal Mobile Telecommunications System. Third generation wireless standard for supporting data transfer rates of 144 kbs (vehicular), 384 kbs (pedestrian), or up to 2 Mbs in buildings. |
| WLAN | Wireless Local Area Network |

In order to promote the understanding of the present invention, exemplary embodiments for determining the transmission quality of a communications link will described with reference to error-rate prediction on multi-state communications links employing so-called effective SNR. Therefore, the wording used in the following will be in line with the terminology commonly used there, e.g. channel will be uses to indicate a communications link in terms of the foregoing.

Figure 4:
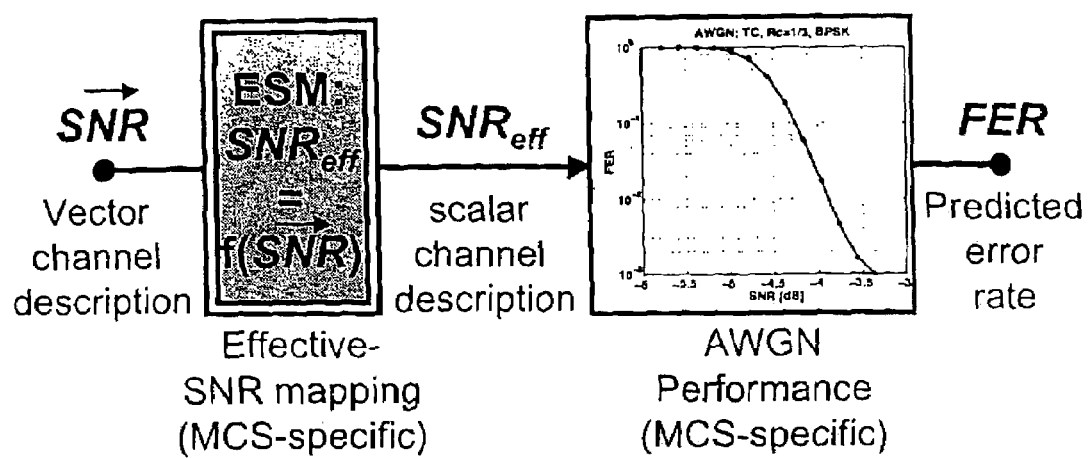
FIG. 4 illustrates a block diagram depicting the basic process underlying one embodiment of the present invention.

One principle of an effective SNR is illustrated in FIG. 4.

The multi-state communications link can be characterized by a vector of SNR values:

$$\vec{SNR} = [SNR_1, \ldots, SNR_N] \quad (1.2)$$

As already mentioned there are numerous possibilities where such multi-state channels may originate. The main idea behind the effective SNR mapping (ESM) is that the vector SNR of multiple SNRs, which provides a full channel description or characterization, is mapped to a single SNR value, the scalar communications link description. The goal is to choose $SNR_{eff}$ such that the error rate performance of the considered MCS for transmission over the static AWGN channel (i.e. average white Gaussian noise channel having a constant SNR=1 state) characterized by SNR=$SNR_{eff}$ matches the one for transmission over the multi-state channel characterized by vector SNR.

Therefore, the performance of coded transmission over multi-state channels is expressed in terms of the AWGN performance. Generally, the effective-SNR mapping is code-dependent or MCS-specific because the way multiple channel states within one code word are exploited depends on the code features.

In the described embodiments, the ESM rule may be adapted to the used channel code. This adaptation can be defined as:

$$FER_{MS}(\vec{SNR}) = FER_A(SNR_{eff}), \text{ with } SNR_{eff} = ESM(\vec{SNR}) \quad (1.3)$$

Without loss of generality, frame error rate (FER) is taken here is an example for the desired error-rate prediction. $FER_{MS}$ (SNR) is the FER on a multi-state channel described by $\vec{SNR}$ and $FER_{eff}$ denotes the FER on a one-state (AWGN) channel with SNR=$SNR_{eff}$. ESM (SNR) provides the mapping of the vector SNR to the scalar $SNR_{eff}$.

To accomplish equation 1.3, two issues are resolved. First, the AWGN performance of the considered MCS should be known, which can be obtained by means of simulation or even analytic calculation (for convolutional codes). Second, an effective SNR mapping is to be derived, which allows for an accurate error-rate prediction.

Possible methods of ESM are the linear and the logarithmic ESM, which are based on the linear and logarithmic mean SNR, respectively.

The linear ESM may be defined by:

$$SNR_{eff} = ESM_{lin}(\vec{SNR}) = E\{\vec{SNR}\} = 1/N \sum_{k=1}^{N} SNR_k, \quad (1.4)$$

where, E {.} is the operator for the expected value.

The linear ESM is suited for smaller SNR variations and it is more appropriate in the low SNR range because the high SNR values are quite strongly weighted due to the linear mean. This does not reflect, however, the code features since from a code point of view there is a certain threshold SNR, beyond which the channel can be seen as reliable. Hence, SNR values beyond such a threshold should be equally weighted whereas for the linear ESM those high SNR values dominate the mapping.

The logarithmic ESM is defined by:

$$SNR_{eff} = \quad (1.5)$$
$$ESM_{log}(\vec{SNR}) = \exp(E\{\log(\vec{SNR})\}) = \exp\left(1/N \sum_{k=1}^{N} \log(SNR_k)\right).$$

Here, exp(.) denotes the exponential function and log(.) denotes the natural logarithm. The arguments sketched for the linear ESM apply also for the logarithmic ESM. The overestimation of high SNR values is less severe for logarithmic ESM because the weighting grows only logarithmic. But the logarithmic ESM exhibits an additional low SNR problem. According to the logarithm ESM, low SNR values are strongly weighted (with a negative sign). From a code point of view there is a certain threshold SNR, below which the channel can be seen as unreliable, namely as an erasure channel.

In the following example, the Union Chernoff bound is used to derive relationships between one-state and multi-state channels regardless of the involved code word distances. This is the basis for the exponential ESM and will be elaborated in the following section.

The union bound for coded binary transmission and maximum-likelihood decoding is given by:

$$P_e\left(\frac{E_S}{N_0}\right) \le \sum_{d=d_{min}}^{\infty} \alpha_d P_2\left(d, \frac{E_S}{N_0}\right) \quad (2.1)$$

where
$P_e(E_S/N_0)$ is the probability of deciding in favor of a wrong code word when the channel symbol SNR equals $E_S/N_0$,
$E_S$ is the mean energy per transmit symbol,
$N_0$ is the noise power density,
$d_{min}$ is the minimum Hamming distance of the binary code,
$a_d$ is the number of code words with Hamming weight d, and
$P_2(d, E_S/N_0)$ is the pair wise error probability of deciding in favor of a code word at Hamming distance d when the channel symbol SNR equals $E_S/N_0$.

The union bound as stated above assumes a linear binary code, which means that the distance distribution seen from any code word is the same. Hence, it is sufficient to consider the Hamming weight (instead of distance) distribution of the code, which corresponds to the assumption that the all-zero code word is transmitted.

The core element of the union bound expression above is the pairwise error probability (PEP) $P_2(d, E_S/N_0)$. It reads for BPSK transmission over an AWGN channel and maximum-likelihood decoding $$P_2\left(d, \frac{E_S}{N_0}\right) = Q\left(\sqrt{2\frac{E_S}{N_0}d}\right) = Q(\sqrt{2\gamma d}) = P_2(d, \gamma), \quad (2.2)$$

where $$Q(x) = \frac{1}{2} \cdot \text{erfc}\left(\frac{x}{\sqrt{2}}\right) = \frac{1}{\sqrt{2\pi}} \int_x^\infty e^{-t^2/2} dt, \, x \geq 0,$$

is the Q-function, a derivative of the complementary Gaussian error function erfc(x), and $\gamma = E_S/N_0$ is introduced as abbreviation for the symbol SNR In practice, the maximum-likelihood decoding can be achieved by the Viterbi convolutional decoder and approximated by the iterative turbo decoder. Applying the Chernoff bounding technique, the upper bound on the Q-function is given by:

$$Q(x) \leq e^{-x^2/2}. \quad (2.3)$$

This leads to the upper bound on the PEP $$P_2(d, \gamma) = Q(\sqrt{2\gamma d}) \leq e^{-\gamma d} = P_{2,Chernoff}(d, \gamma), \quad (2.4)$$

where the expression $P_{2,Chernoff}(d, \gamma)$ denotes the Chernoff bound on $P_2(d, \gamma)$. For the one-state channel considered so far in the derivation, it can be observed that:

$$P_{2,Chernoff}(d, \gamma) = e^{-\gamma d} = (e^{-\gamma})^d \quad (2.5)$$
$$= [P_{2,Chernoff}(1, \gamma)]^d,$$

which means that the Chernoff-bounded PEP is directly coupled to the Chernoff-bounded (uncoded) symbol error probability. Therefore, the Chernoff-bounded error probability $P_{2,Chernoff}(\gamma)$ only depends on the weight distribution of the code and the Chernoff-bounded (uncoded) symbol probability, namely:

$$P_e(\gamma) \leq \sum_{d=d_{min}}^\infty a_d P_2(d, \gamma) \leq \sum_{d=d_{min}}^\infty a_d [P_{2,Chernoff}(1, \gamma)]^d = \quad (2.6)$$

$$P_{e,Chernoff}(\gamma)$$

There is no further need to calculate explicitly the pairwise error probabilities for all considered weights d individually. This feature will play the decisive role when defining the exponential ESM below.

The principles of the Union Chernoff bound for multi-state channels shall now be explained at the simple example of a two-state channel. The result may be extended to multi-state channels in a straightforward way. The two-state channel can be characterized by the SNR vector:

$$\vec{\gamma} = [\gamma_1, \gamma_2]. \quad (2.7)$$

In general, the two states may occur with unequal frequency or probability seen over the code word. Therefore, the probability $\rho_k$ is defined as occurrence probability within the code word length for the SNR value $\gamma_k$, k=1, 2, whereby $p_1 + p_2 = 1$. Furthermore, the SNR values are assumed to be independent of each other which requires a corresponding interleaver in practice. Let us now look at two arbitrary code words with Hamming distance d. The SNR value, either $\gamma_1$ or $\gamma_2$, associated to each of the d difference symbols is depending on the respective symbol position. That means, the exact PEP for these 2 code words in case of a 2-state channel depends no longer on the distance d only, but also on the position of the d difference symbols. Thus, the union bound approach in the classical sense that all code word pairs are compared would require detailed code knowledge about bit positions and this is not feasible in practice. A solution to this problem is to use the mean PEP averaged over all possible positions of the d difference symbols. This is equivalent to average over all possible cases how the SNR values $\gamma_1$ and $\gamma_2$ may be distributed among the d difference symbols. The Chernoff-bounded PEP can be expressed as:

$$P_{2,Chernoff}(d, [\gamma_1, \gamma_2]) = \sum_{i=0}^d \binom{d}{i} p_1^i p_2^{d-i} e^{-(i\gamma_1 + (d-i)\gamma_2)}. \quad (2.8)$$

For explanation, $p_1^i p_2^{d-i}$ represents the probability that i of the d difference symbols are associated with $\gamma_1$ and the residual (d−i) ones with $\gamma_2$. There are $\binom{d}{i}$ such events and $\exp[-(i\gamma_1 + (d-i)\gamma_2)]$ is the Chernoff-bounded PEP for such an event.

Rewriting of equation (2.8) and applying the binomial theorem yields:

$$P_{2,Chernoff}(d, [\gamma_1, \gamma_2]) = \sum_{i=0}^d \binom{d}{i} (p_1 e^{-\gamma_1})^i (p_2 e^{-\gamma_2})^{d-i} \quad (2.10)$$
$$= (p_1 e^{-\gamma_1} + p_2 e^{-\gamma_2})^d.$$

The term in brackets is the averaged Chernoff-bounded symbol error probability on the two-state channel. Therefore, the relationship in equation (2.5) found for the one-state channel can also be verified to be valid on the two-state channel:

$$P_{2,Chernoff}(d, [\gamma_1, \gamma_2]) = [P_{2,Chernoff}(1, [\gamma_1, \gamma_2])]^d. \quad (2.11)$$

By applying the polynomial theorem it can be shown that the same result is valid for the multi-state channel:

$$P_{2,Chernoff}(d, \vec{\gamma}) = [P_{2,Chernoff}(1, \vec{\gamma})]^d \quad (2.12)$$

This feature of the Chernoff-bounded PEP is exploited in the following to derive the exponential ESM.

The goal, is to find an effective SNR value $\gamma_{eff}$ of an equivalent one-state channel such that the Chernoff-bounded error probability equals the one on the multi-state channel:

$$P_{e,Chernoff}(\gamma_{eff}) = P_{e,Chernoff}(\vec{\gamma}). \quad (2.13)$$

Due to the feature stated in equation (2.12), this goal is achieved by matching the respective Chernoff-bounded symbol error probabilities:

$$P_{2,Chernoff}(1,\gamma_{eff}) = P_{2,Chernoff}(1,\vec{\gamma}). \qquad (2.14)$$

Inserting the Chernoff bound expressions here results in the formula how to calculate the effective SNR according to the exponential ESM:

$$\gamma_{eff} = ESM_{exp}(\vec{\gamma}) = -\log_e(E\{\exp(-\vec{\gamma})\}) = -\log_e\left(\sum_{k=1}^{N} p_k e^{-\gamma_k}\right). \qquad (2.15)$$

The name exponential ESM is due to the expression in brackets, where the mean SNR is taken in the exponential domain. Although the exponential ESM is derived via the Union bound for coded transmission, no knowledge on the code weight or distance distribution is required unlike for the Union Bound itself. It is obvious to those skilled in the art from equation (2.15), that the knowledge of SNRs $\gamma_k$ corresponding to the multiple channel states is sufficient to calculate the effective SNR.

The exponential ESM given in equation (2.15) provides an effective SNR such that the Union Chernoff bounds for the multi-state channel and the equivalent 1-state channel are the same.

The exponential ESM is based on the error-rate calculation via the Union bound. The resulting expression equation (2.15) is simple to use in practice and show good results. An alternative way to develop an effective-SNR mapping is what can be called the information-value approach. It turned out that there are many similarities how to map the multi-state SNRs on the effective one for the information-value approach and for the Union Chernoff bound one, although the underlying concepts are quite different.

One aspect is how is the code performance affected if the symbols within one code word experience different channel states. Seen from a decoder point of view, the situation can be interpreted as that the soft bits fed to the decoder exhibit different reliabilities or in other words provide different information values, since e.g. a very reliable soft bit provides already information close to 1 bit.

The soft bit information value corresponding to a channel state $\gamma_k$ shall be denoted by I ($\gamma_k$). The classical information value from information theory is the mutual information between channel input and output or mapped to the present case between encoder-output bit and decoder-input soft bit. The channel coding theorem states that an ideal code and decoder is capable of transmitting reliably at a code rate equal to the mutual information of the channel, which is in this example equals the channel capacity for BPSK transmission. The information measure based on the capacity for BPSK on AWGN can be defined as:

$$I_C(\gamma_k) = C_{BPSK} = E_{XY}\left\{\log_2 \frac{P(Y|X,\gamma_k)}{\sum_X P(X)P(Y|X,\gamma_k)}\right\} \qquad (2.16)$$

with $X \in \{\pm 1\}, y \in \mathcal{R}$, wherein P (Y I X, $\gamma_k$) is the AWGN transition probability density conditioned on transmit symbol X and channel SNR equal to $\gamma_k$ and P(X)=1/2 is the BPSK symbol a-priori probability. R is the set of real numbers. The expression equation (2.16) is evaluated numerically, because there is no closed-form solution to it. Thus, it may be beneficial to store the BPSK capacity values for an appropriate SNR grid in a table or database.

Furthermore, the channel coding theorem states that reliable transmission on multi-state channels is possible at a rate equal to the average mutual information on the multi-state channel. Hence, from an information theory point of view, the effective-SNR mapping for capacity-achieving codes with infinite code length is obtained via information averaging and mapping the information back to SNR:

$$\gamma_{eff} = I^{-1}(I_{av}) \qquad (2.17)$$

$$I_{av} = \sum_{k=1}^{N} p_k I(\gamma_k),$$

where $I^{-1}(.)$ is the inverse function of I (.). It delivers the SNR value that corresponds to a certain information value. Thereby, the information value I ($\gamma_k$) is assumed to be the BPSK channel capacity.

Practical codes, however, do not show the mentioned capacity-achieving feature. Therefore, other information measures could be of interest as well. Known information measures are for example:

$$I_{RO}(\gamma_k) = 1 - \log_2(1 + e^{-\gamma_k/2}), \text{ BPSK cutoff rate}, \qquad (2.18)$$

$$I_{Gauss}(\gamma_k) = \frac{1}{2}\log_2(1 + \gamma_k), AWGN \text{ capacity, real Gaussian input.} \qquad (2.19)$$

In order to compare features of different effective-SNR mappings, it is possible to formally define further information measures corresponding to known ESMs, e.g. linear ESM, logarithmic ESM, exponential ESM:

$$I_{lin}(\gamma_k) = \gamma_k, \text{ linear ESM} \qquad (2.20)$$

$$I_{log}(\gamma_k) = \log(\gamma_k), \text{ logarithmic ESM,} \qquad (2.21)$$

$$I_{exp}(\gamma_k) = 1 - e^{-\gamma_k}, \text{ exponential ESM.} \qquad (2.22)$$

The exponential ESM is modified compared to equation (2.15) such that the information value is increasing with increasing SNR.

The information averaging and re-mapping as in equation (2.17) is proven to be the correct information theoretic way of information handling in case of binary coded transmission for the BPSK capacity measure only. Nevertheless, this principle shall be also applied to the other stated information measures.

Figure 5:
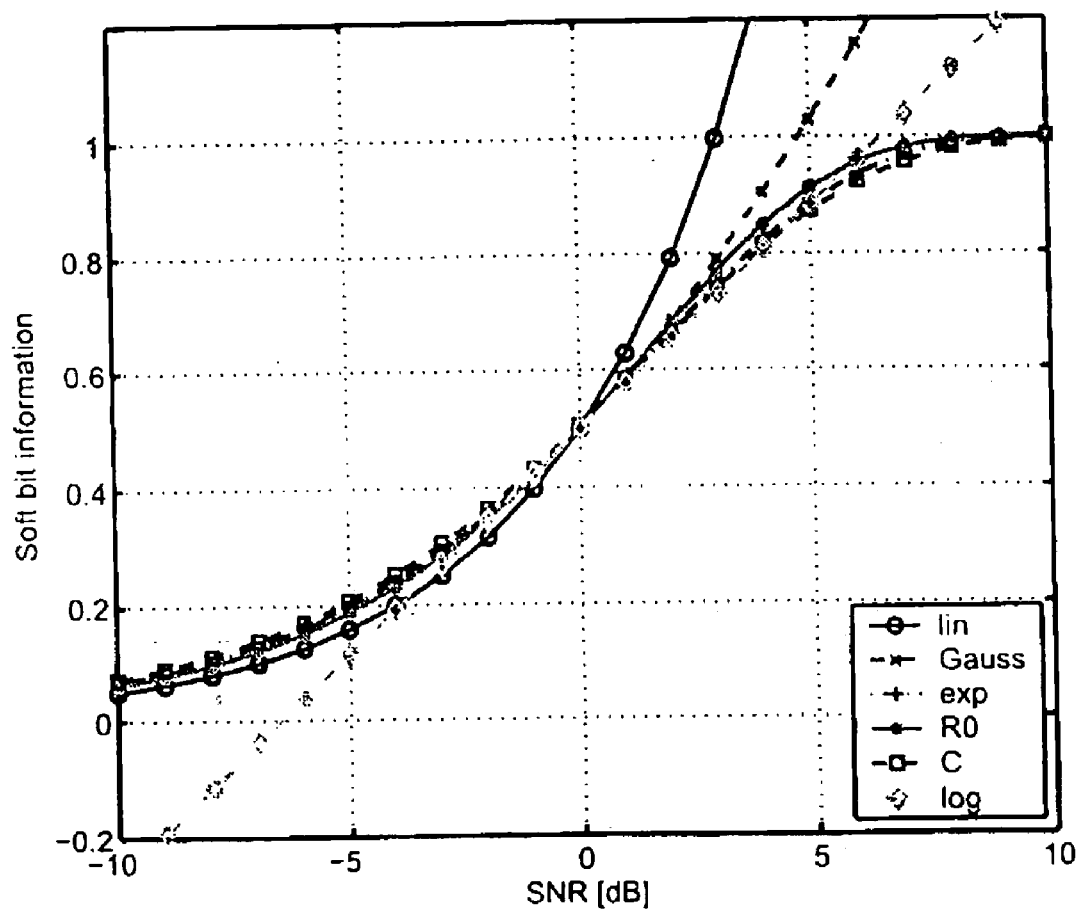
FIG. 5 is a diagram illustrating the soft bit information vs. SNR.

In FIG. 5 the information measures mentioned previously are plotted as information value in bit versus $SNR_\gamma$. To allow for a comparison, all curves were shifted such that I($\gamma$=0 dB)=1/2. Moreover, the logarithmic ESM was calculated for the logarithm base of 20 to have a slope similar to the other curves.

The first observation is that the measures $I_{exp}$, $I_{RO}$, and $I_C$ have similar characteristics and are hardly distinguishable in the plot. This result indicates that the exponential ESM may be also motivated from an information-value approach as an easy-to-calculate information measure approaching the information theoretic ones $I_{RO}$ and $I_C$.

A further apparent feature of the measures $I_{exp}$, $I_{RO}$, and $I_C$ is that they are bounded between 0 and 1. Regarding these quantities as soft bit information, this seems to be trivial.

However, this feature leads to the weakness of the "traditional" linear and logarithmic ESM.

The linear ESM is highly overestimating the information increase for SNRs higher than the operating point $\gamma=0$ dB or in general the linear ESM is not suited for high SNRs. Especially the big slope for information values beyond 1 makes the linear ESM inappropriate for multi-state channels with large variation in the different SNRs. In principle, the same argumentation does hold for $I_{Gauss}$, although $I_{Gauss}$ shows already some improvements over $I_{lin}$.

The logarithmic ESM is essentially in line with the information theoretic measures up to 1 bit. The main weakness of the logarithmic ESM shows up in the range far below the operating point or in general for low SNRs or low rates where even negative information values appear. From an information value point of view, this may be interpreted as that there are channel states annihilating the information coming from other states. Therefore, the logarithmic ESM is probably not well suited for low SNRs or low rates on multi-state channels with significantly different states. It should be noted here that bounding the respective information measures of linear and logarithmic ESM as well as $I_{Gauss}$ between 0 and 1 bit already accomplishes a great improvement of the error-rate prediction.

For the sake of visualizing the differences of the discussed information measures, the curves in FIG. 5 were normalized by shifting the x-axis such that I ($\gamma=0$ dB)=1/2. Hence, the question remained open whether there is a criterion how to shift the x-axis in order to obtain a good error-rate prediction. Keeping the information-value interpretation in mind, one shifting solution could be to normalize the information measure such that $I(\gamma=\gamma_{tar})=R_c$. Thereby, $\gamma_{tar}$ is the target SNR for which the binary code achieves the target error-rate performance on the AWGN channel, and $R_c$ is the rate of the binary code.

In the following discussion, implementation of the above described embodiment (exponential ESM) is described and its accuracy.

The implementation of exponential ESM for a certain MCS consists of four steps:

1. The coded error rate performance over the AWGN channel is determined either by simulations or calculations.
2. The coded error rate performance over an exemplarily chosen multi-state channel is simulated.
3. The accuracy of the exponential ESM is evaluated.
4. Improve the accuracy by determining a code specific SNR offset $\gamma_{cod}$.

In the following, an exemplary MCS is taken to describe the basic procedures and to show the achievable accuracy of the error rate prediction by the exponential ESM. The chosen MCS is determined by a turbo code (TC) of rate $R=1/3$ and the symbol alphabet BPSK. This MCS is further referred to as MCS1. The block length was arbitrarily chosen to $B_f=764$ resulting in a code word length including 12 tail bits of $L_{CW}=764*3/1+12=2304$. It will be shown later that the presented exponential ESM is applicable to arbitrary block lengths without any changes.

Figure 2:
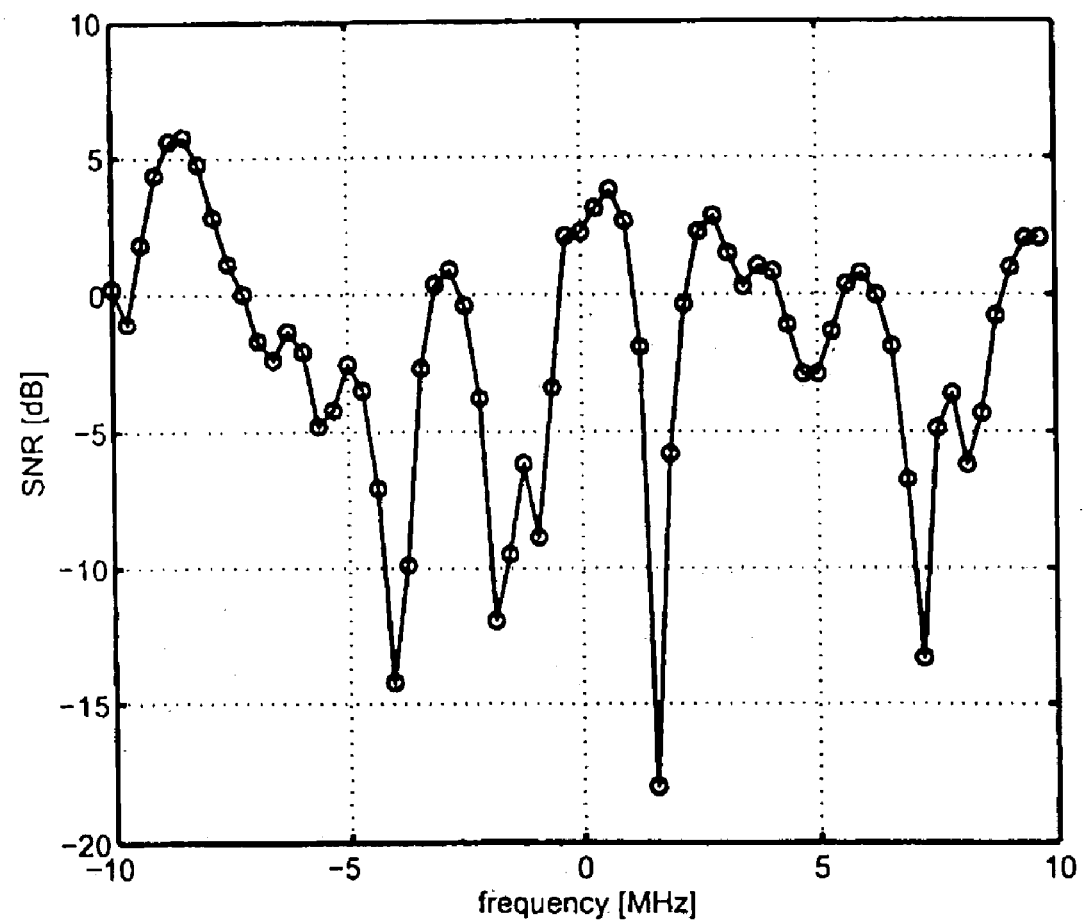
Figure 3:
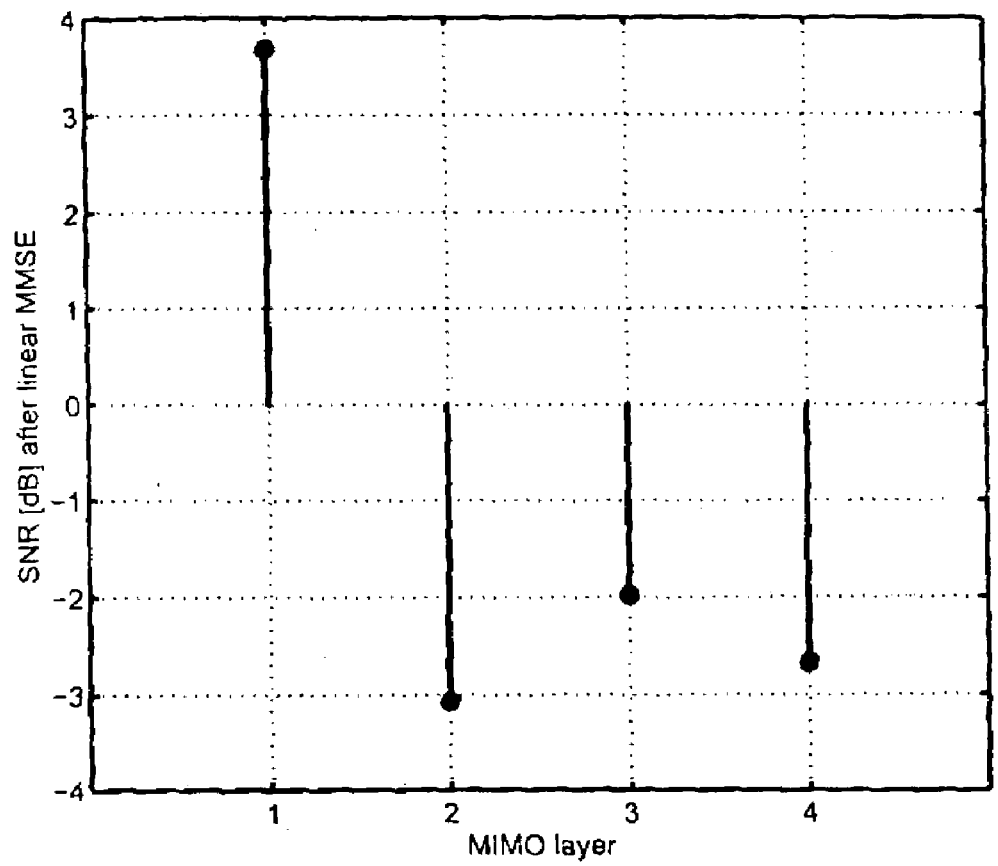
Figure 6:
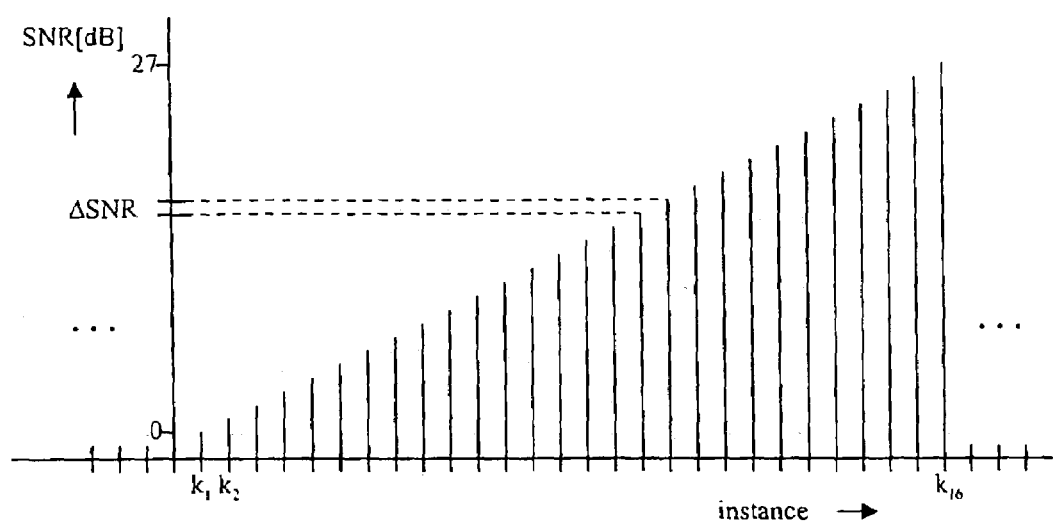
FIG. 6 is an exemplary diagram illustrating a multi-state channel MS1.

The example multi-state channel used to show the basic procedure of implementing step 2 of the exponential ESM is in the following referred to as channel MS1. In this example, the channel MS1 is characterized by 16 different SNR values. The 16 different SNR values are periodically repeated over the code word and, the SNR difference between two adjacent symbols is 1.8 DB, i.e. the difference between the first and the 16th symbol is 15*1.8=27 dB (see FIG. 6). The channel MS1 has already a large variation in SNR. In contrast to the examples illustrated in FIGS. 1, 2, and 3, most SNR values differ significantly from the mean value.

The number of different subcarrier SNRs and the increment between two adjacent symbols is more or less arbitrarily chosen. The only requirement is that the number of different SNR values and the total range of SNR values is sufficiently high in order to test the suitability of the exponential ESM also for extreme cases and to achieve more accuracy in the configuration of the MCS-specific SNR offset as explained below.

As already described, the first step is to evaluate the error rate for the respective modulation and coding scheme—in this example MCS1—over the AWGN channel. This was done by a simulation and second, the error rate over an arbitrarily chosen multi-state channel—in this case the channel MS1—was determined by a simulation as well.

As a third step, the exponential ESM given in equation (2.15) is applied to calculate $\gamma_{eff}$ for channel MS1. That means the vector channel description $\vec{\gamma}$ of the multi-state channel is mapped to the scalar one $\gamma_{eff}$. Expressed in terms of error rate this reads:

$$FER_{MS}(\vec{\gamma})=FER_{MS}(\gamma_{eff}). \quad (3.1)$$

Figure 7:
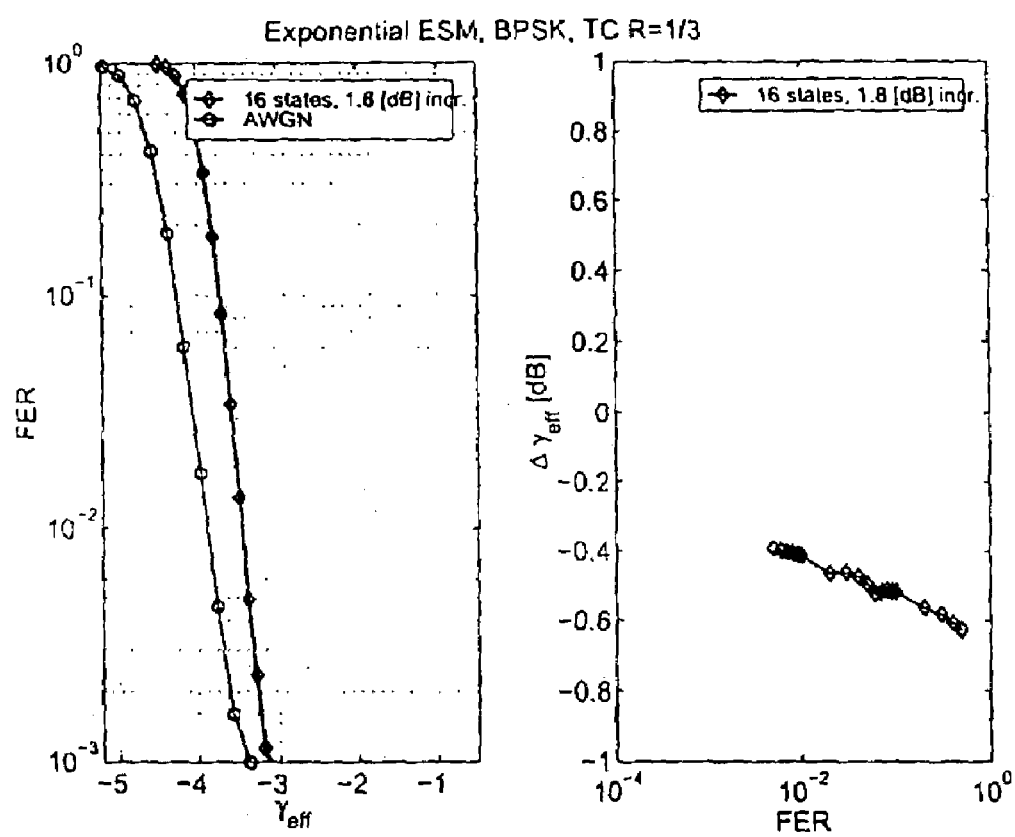
FIG. 7 is a diagram illustrating the benefits of the exponential ESM approach according to the invention.

In FIG. 7a both the frame error rate (FER) for AWGN and channel MS1 are shown versus $\gamma_{eff}$. The exponential ESM would enable to accurately predict the FER if both curves were congruent, since the target can be stated as:

$$FER_{MS}(\gamma_{eff})!=FER_A(\gamma_{eff}). \quad (3.2)$$

In order to visualize the quality of the ESM the error measurement $\Delta\gamma_{eff}$ is defined as:

$$\Delta\gamma_{eff}(FER)=\gamma_{eff}|_{FER_A=FER}-\gamma_{eff}|_{FER_{MS}=FER}. \quad (3.3)$$

It is plotted in FIG. 7b. One can see that the accuracy depends on the FER and varies between −0.4 dB and −0.6 dB for a FER of $10^{-2}$ and 1, respectively. As already mentioned, to improve the accuracy of the exponential ESM an offset $\gamma_{cod}$ shall be introduced in a fourth step and the modified exponential ESM reads as follows:

$$\gamma_{eff}=-\log_e\left(\sum_{k=1}^{N}p_k e^{-\left(\frac{\gamma_k}{\gamma_{cod}\cdot\gamma_{mod}}\right)}\right)\cdot\gamma_{cod}\cdot\gamma_{mod}. \quad (3.4)$$

Thereby, a second SNR correction term $\gamma_{eff}$ is introduced, which adapts the ESM to any symbol alphabet. Since the original derived formula equation (2.15) is valid for the equivalent channel for binary transmission. In FIG. 8 the respective values for $\gamma_{eff}$ for the different symbol constellations used in this report are given. Here, in view of equation (3.4), it has to be noted that FIG. 8 refers to values in dB.

For 16 QAM the 8 dB represents only an approximation, since 16 QAM itself can already be seen as a multi-state channel from a binary symbol transmission point of view. In this example, it has turned out that the 8 dB assumption works quite well and therefore, we stick to it. Furthermore, the SNR offset $\gamma_{cod}$ will reduce the error, which is introduced by the approximation of $\gamma_{mod}$ for 16 QAM.

$\gamma_{cod}$ is chosen such that:

$$\Delta\gamma_{eff}(FER_{tar})=0, \quad (3.5)$$

wherein $FER_{tar}$ is the target FER. This guarantees a high accuracy for the operating region.

Figure 9:
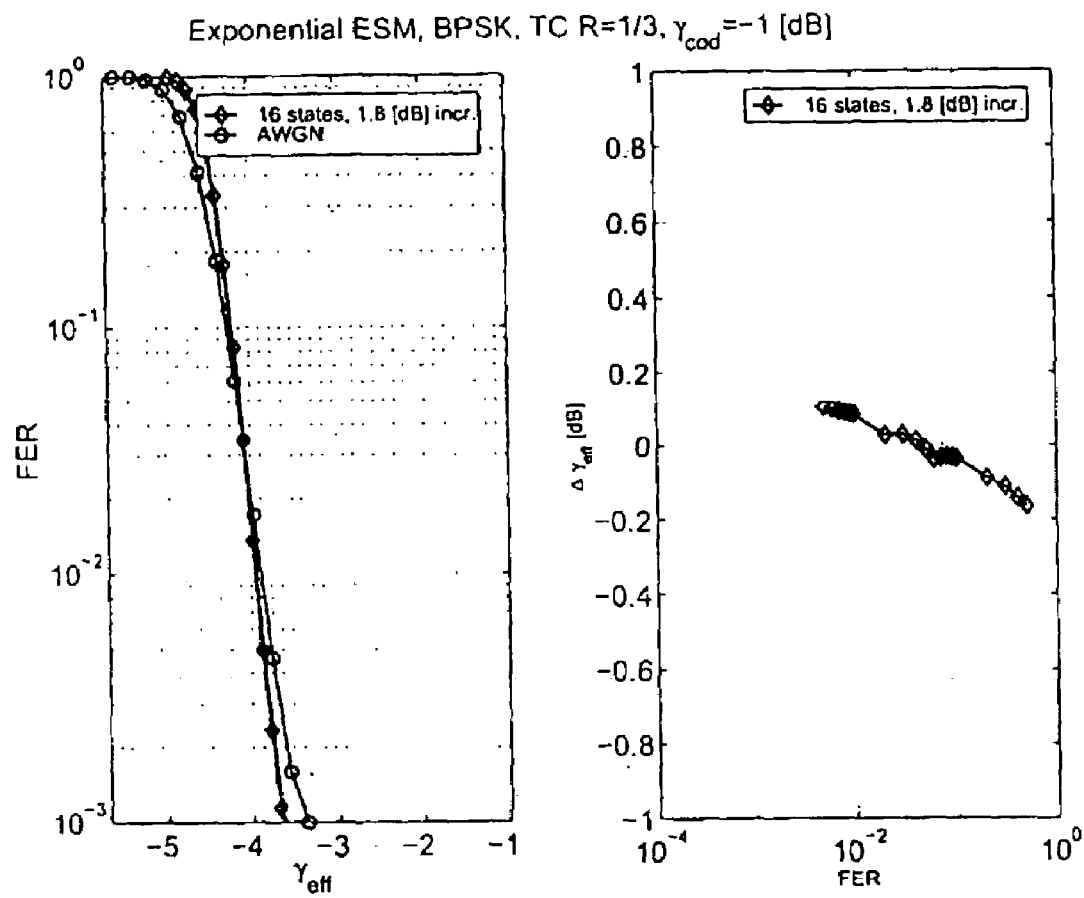
FIGS. 9 and 10 are diagrams illustrating the benefits of the exponential ESM approach with additional correction factors according to the invention.

By adapting $\gamma_{cod}$ according to the respective MCS the degree of congruence of both curves in FIG. 8a can be improved resulting in a lower $\Delta\gamma_{eff}$. The result for $\gamma_{cod}$=−1.0 dB is shown in FIG. 9.

The four steps described above are sufficient to fully determine the exponential ESM for the particularly chosen MCS1.

Figure 10:
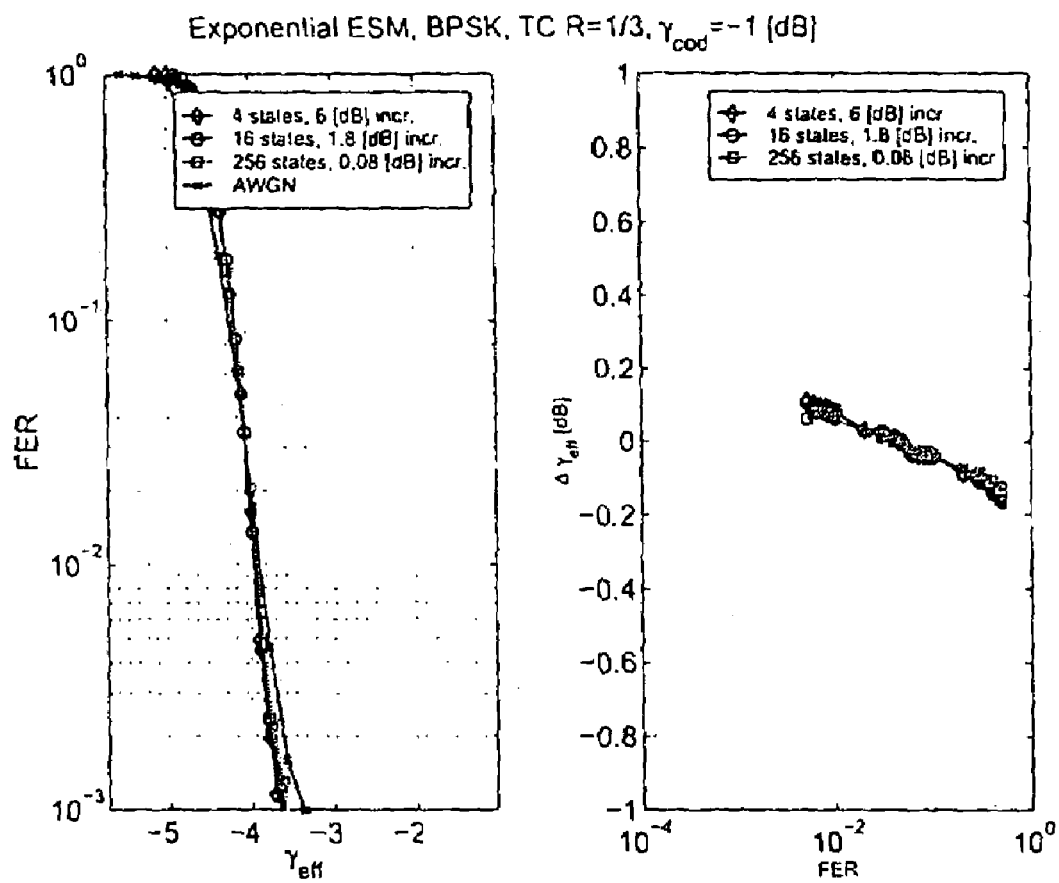

In order to prove that the exponential ESM with $\gamma_{cod}$=−1 dB provides accurate error rate prediction, simulations over two more different multi-state channels were performed using MCS1. The results depicted in FIG. 10 show that the accuracy is the same for all used multi-state channels. The multi-state channel referred to in the following as channel MS2 is characterized by 4 different SNR values differing by 6 dB and the channel MS3 is characterized by 256 different SNR values differing by 0.08 dB. Generally speaking, the exponential ESM together with an MCS specific SNR offset provides an efficient, accurate and easy-to-use method to predict the error rate of coded transmission over multi-state channels.

By introducing an MCS specific SNR offset, the accuracy of the exponential ESM can be significantly improved. In the following simulation results for other MCS given in FIG. 11 are shown. For each MCS a specific SNR offset is determined and as a reference also listed in FIG. 11. From comparing MCS1 and MCS7 one can see that these modulation and coding schemes differ only with respect to their modulation scheme. Therefore, the SNR offset $\gamma_{cod}$ is identical in both cases.

Furthermore, the effect of the block length is shown and, last but not least, simulation results for the linear and the logarithmic ESM are shown in order to compare the achieved accuracy of the exponential ESM with the one of traditional methods.

In order to prove that the accuracy of the exponential ESM is independent from the actual channel condition various multi-state channels were used for the simulations see FIG. 12. The multi-state channels MS5 and MS10 represent e.g. the situation where the different SNR values within one code word do not differ significantly. In contrast to this the multi-state channel MS13 provides highly varying SNR conditions within one code word.

Figure 13:
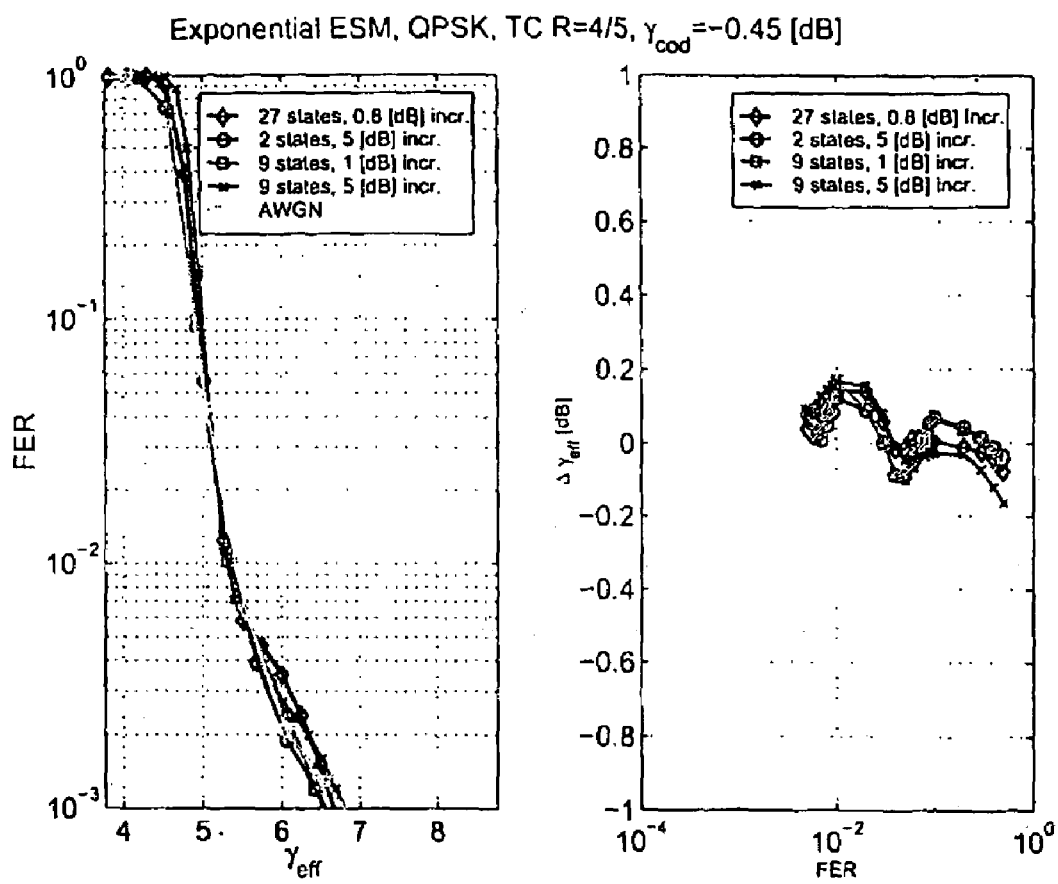
FIGS. 13 to 25 show diagrams illustrating, the benefits of the exponential ESM approach according to the invention for various transmission scenarios.
Figure 14:
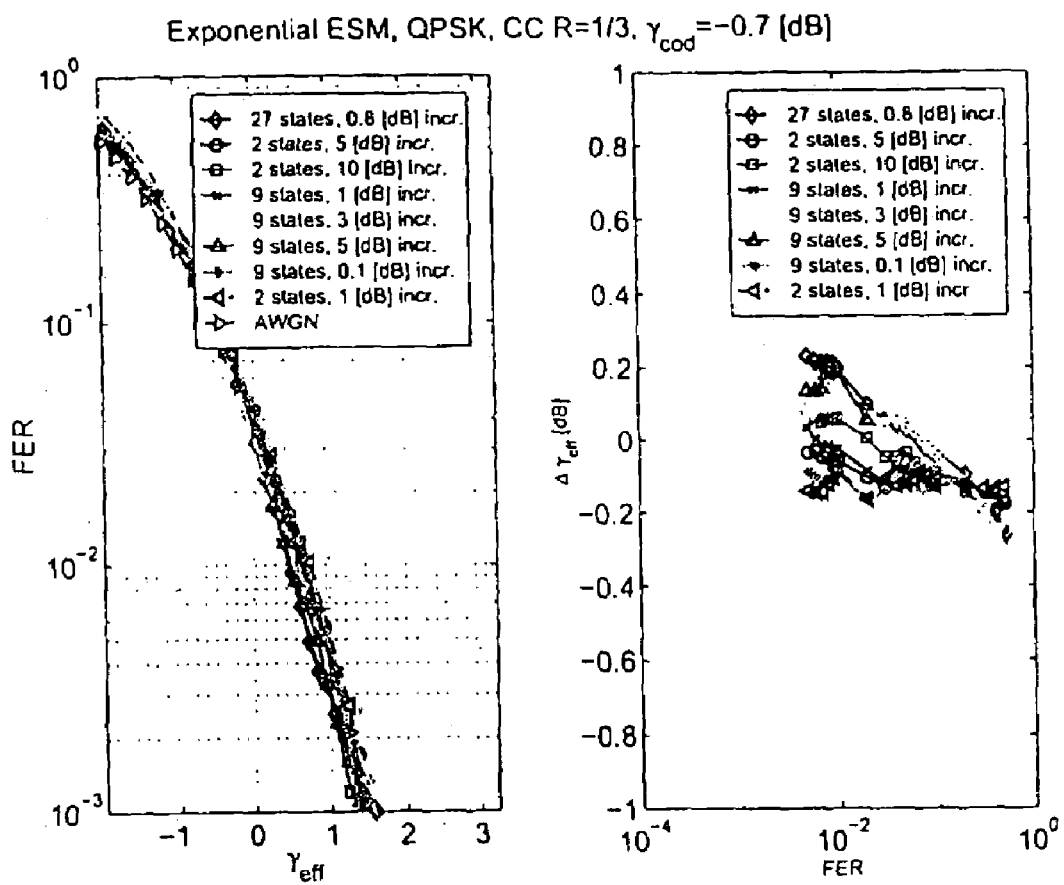
Figure 15:
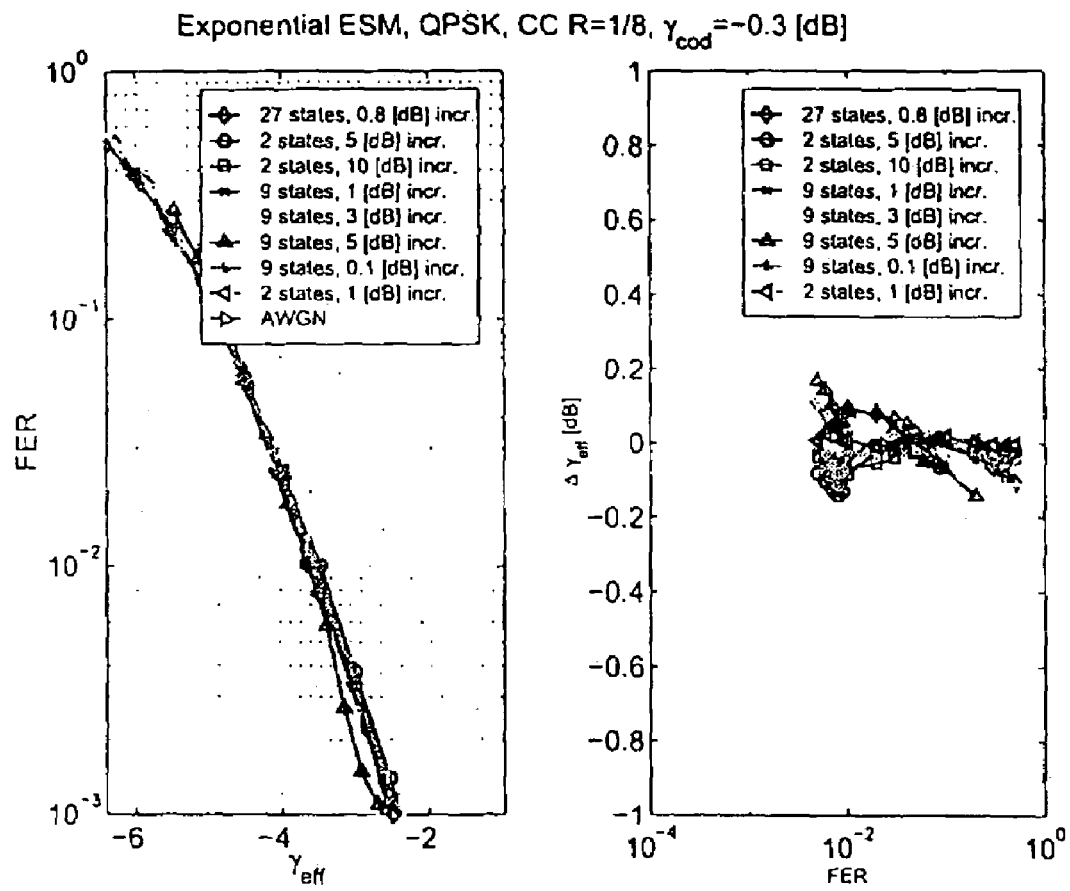
Figure 16:
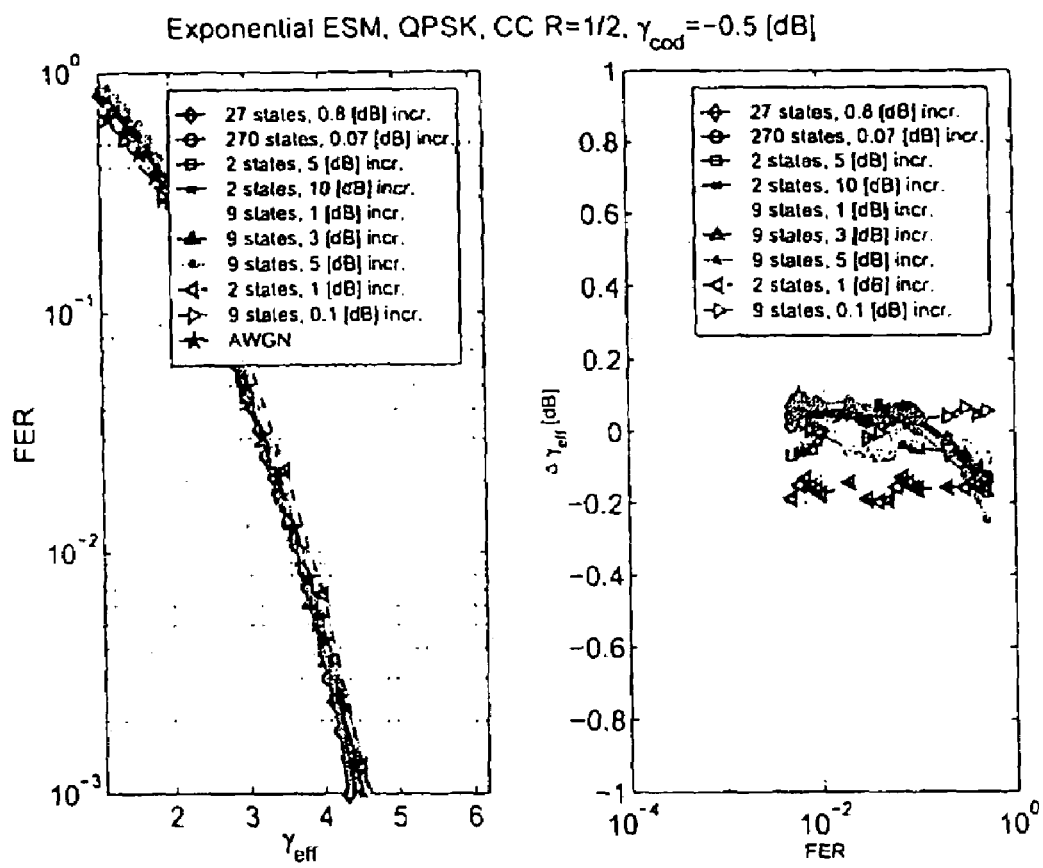
Figure 17:
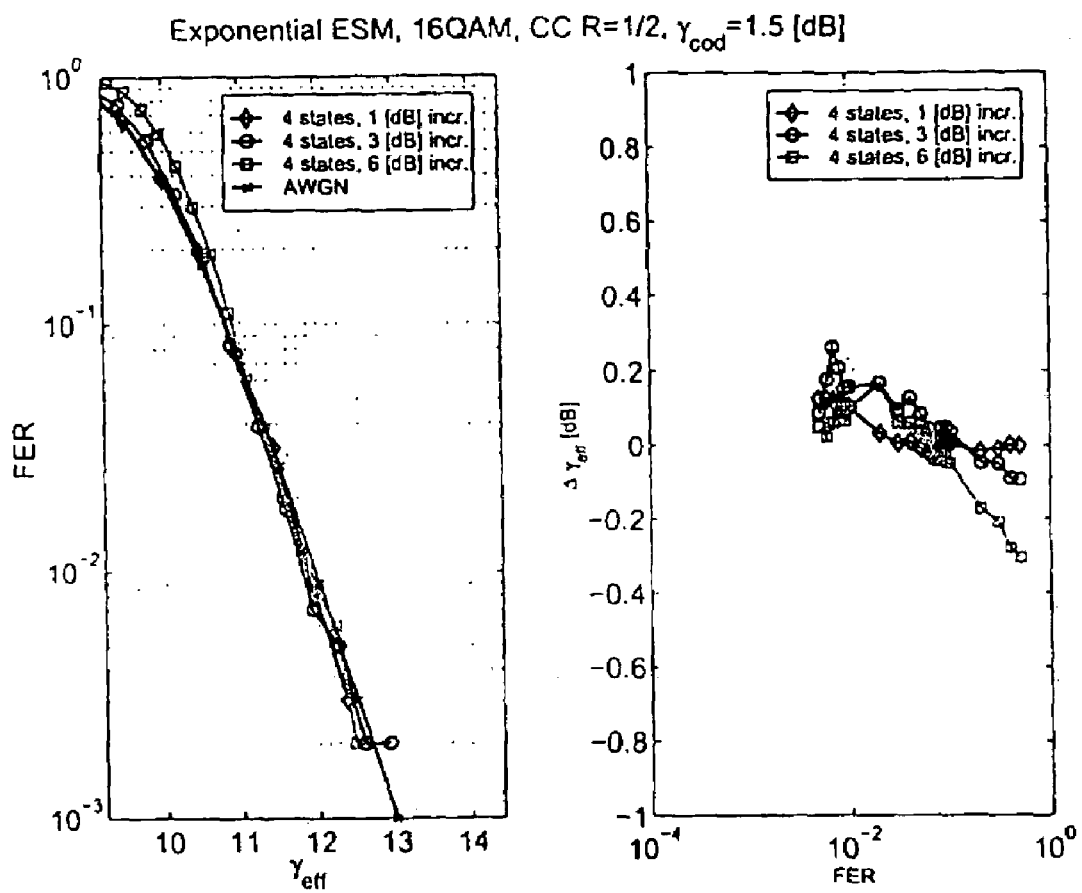

In FIG. 13 the simulation result for the MCS5 are depicted. In order to provide a good congruence the SNR offset was chosen as $\gamma_{cod}$=−0.45 [dB], while $\gamma_{mod}$=3 [dB] due to QPSK modulation (see FIG. 8). From FIG. 13b one can see that the deviation is within +−0.2 dB even for the highly varying SNR conditions within one code word (channel MS13).

In FIGS. 14 to 17, the simulation results for MCS2, 3, 4, and 6 are shown. For all MCS the error in predicting $\Delta_{eff}$ is within +−0.2 dB.

Figure 18:
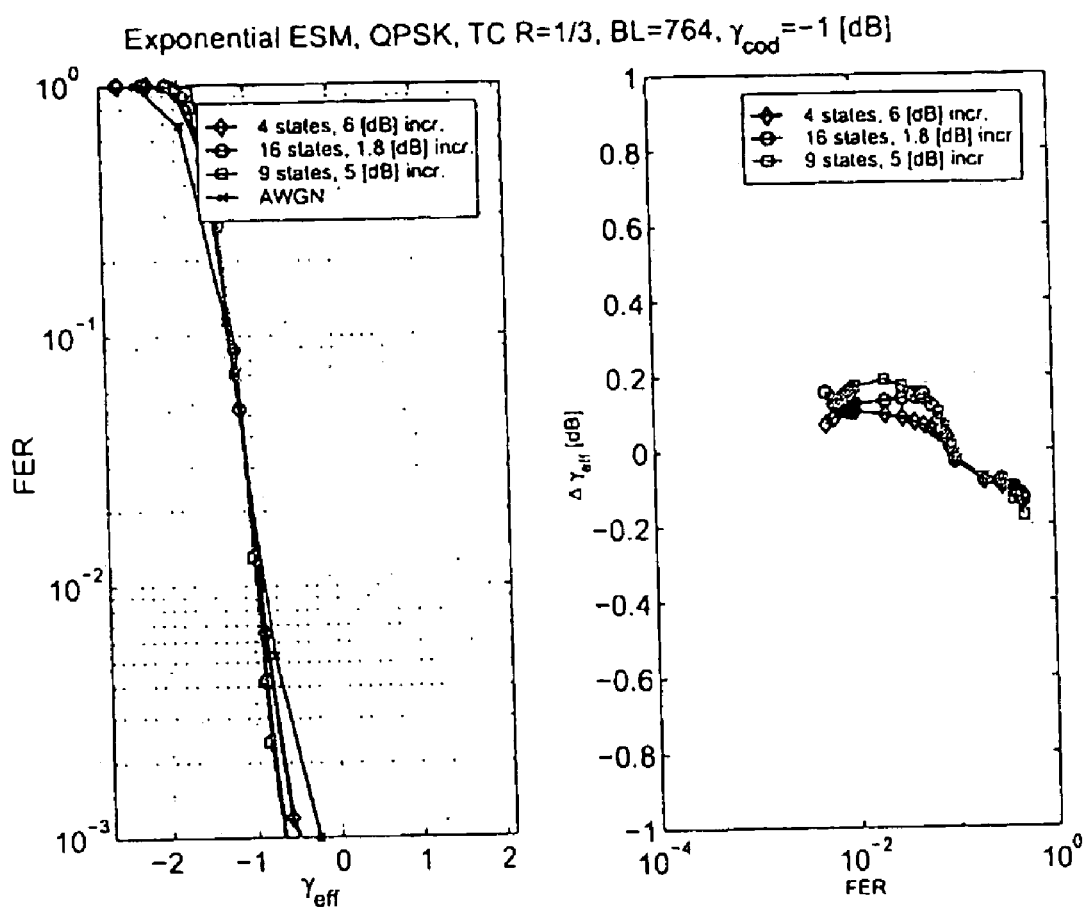
Figure 19:
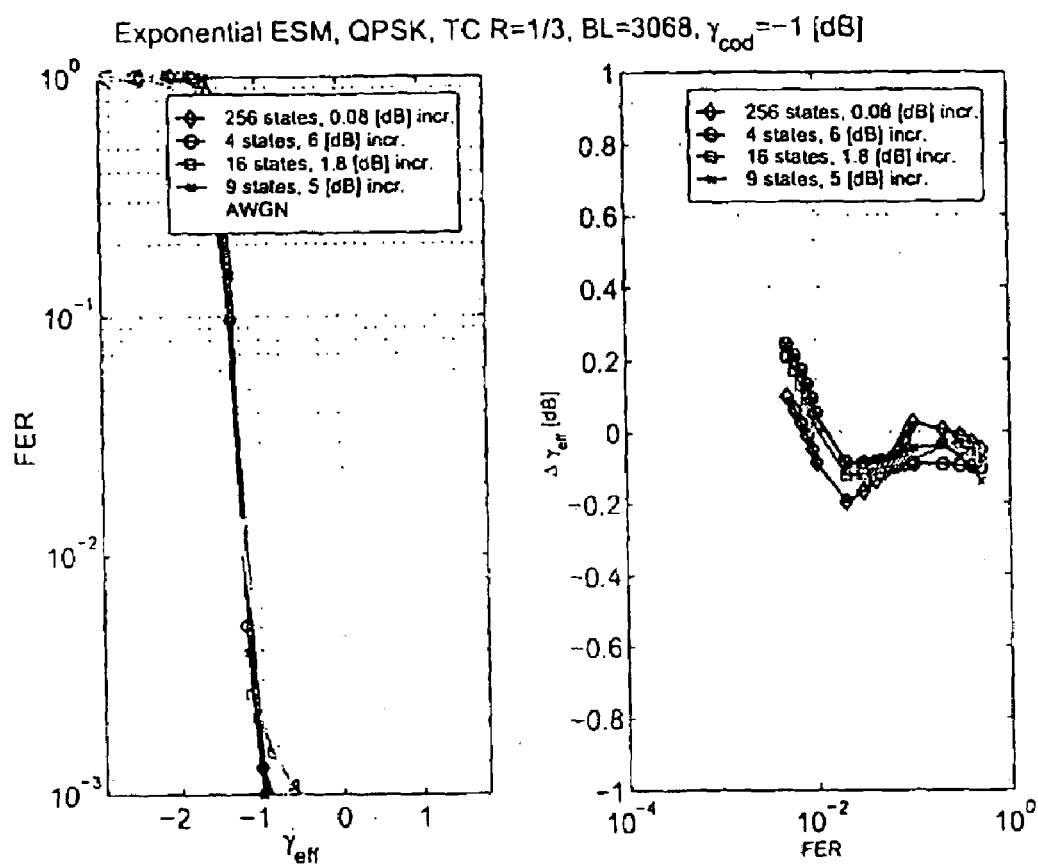

In the following the impact of the block length on the exponential ESM is evaluated. The first two figures (FIG. 18 and FIG. 19 show the FER$\gamma_{eff}$ and $\Delta\gamma_{eff}$ (FER) for the modulation and coding scheme MCS7 for a block length of $B_L$=764 and $B_L$=3068, respectively. In both cases the optimum result was obtained using an SNR offset $\gamma_{cod}$=−1 dB.

Figure 20:
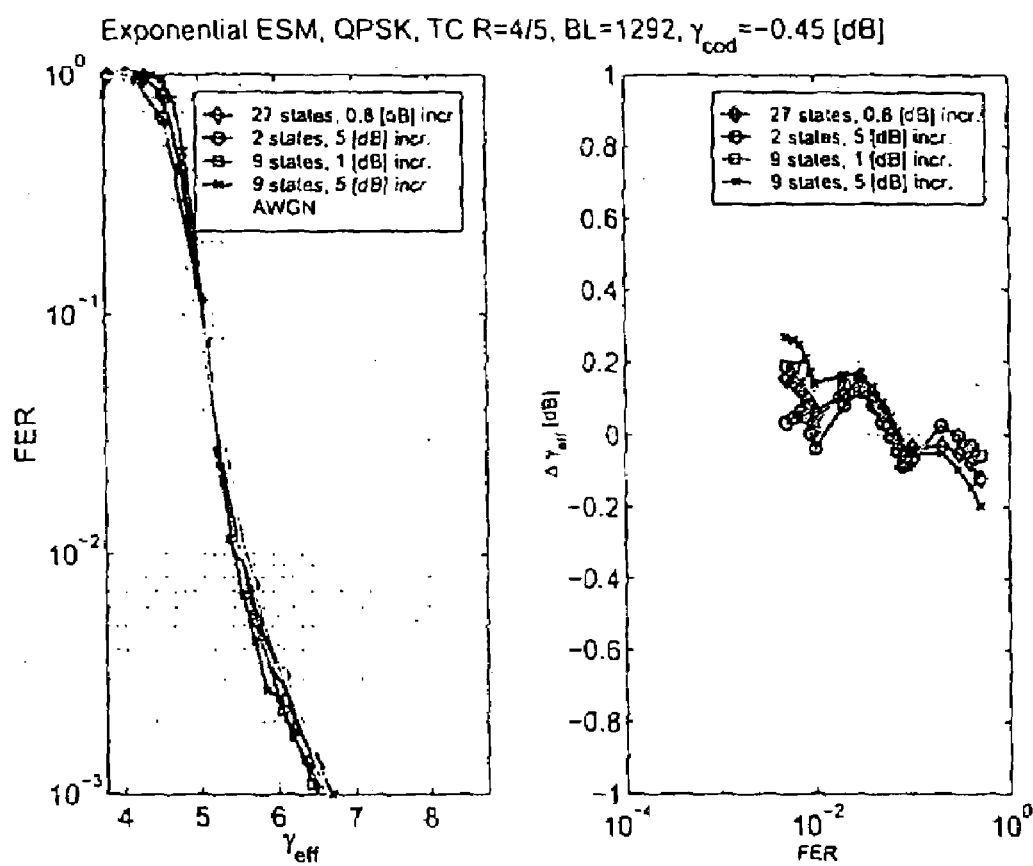
Figure 21:
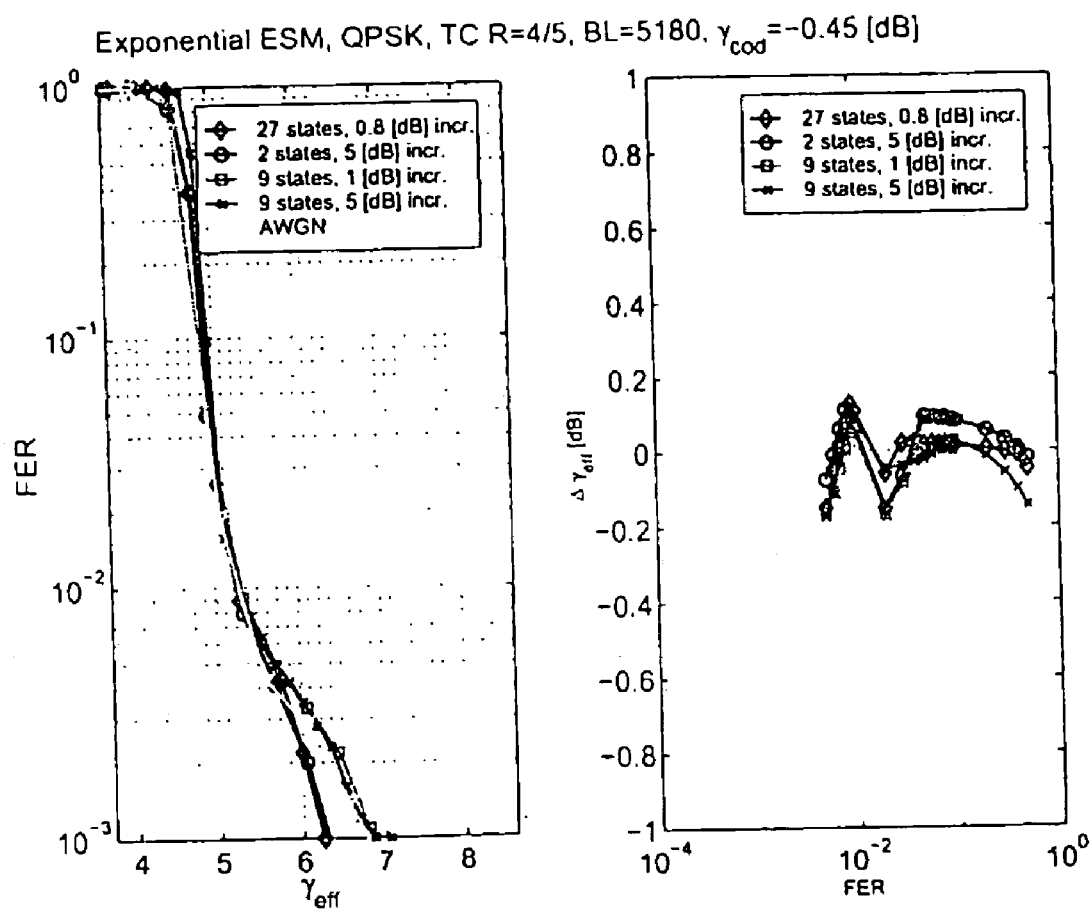

The FIG. 20 and FIG. 21 show the FER($\gamma_{eff}$) and $\Delta\gamma_{eff}$ (FER) for the modulation and coding scheme MCS4 for a block length of $B_L$=1292 and $B_L$=5180, respectively. In both cases the optimum result was obtained using an SNR offset $\gamma_{cod}$=−0.45 dB. The simulation results presented here show that the SNR offset $\gamma_{cod}$ is independent from the block length and therefore depends only on the coding scheme.

Figure 22:
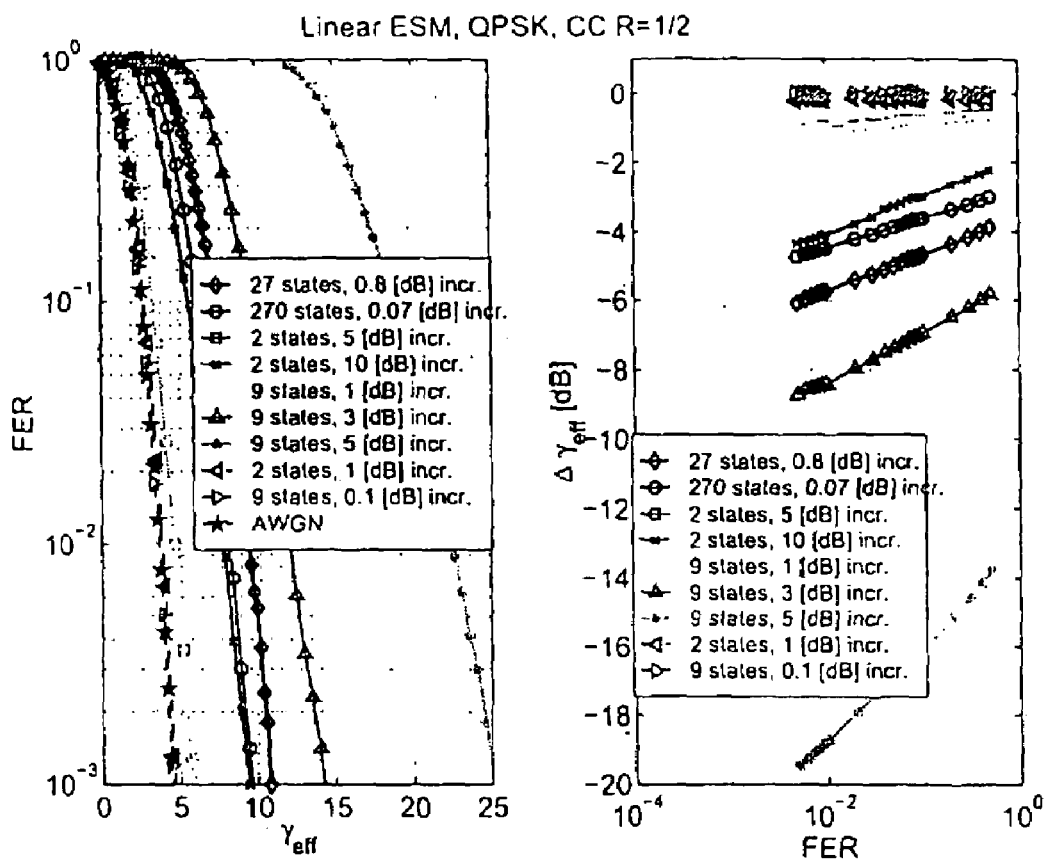
Figure 23:
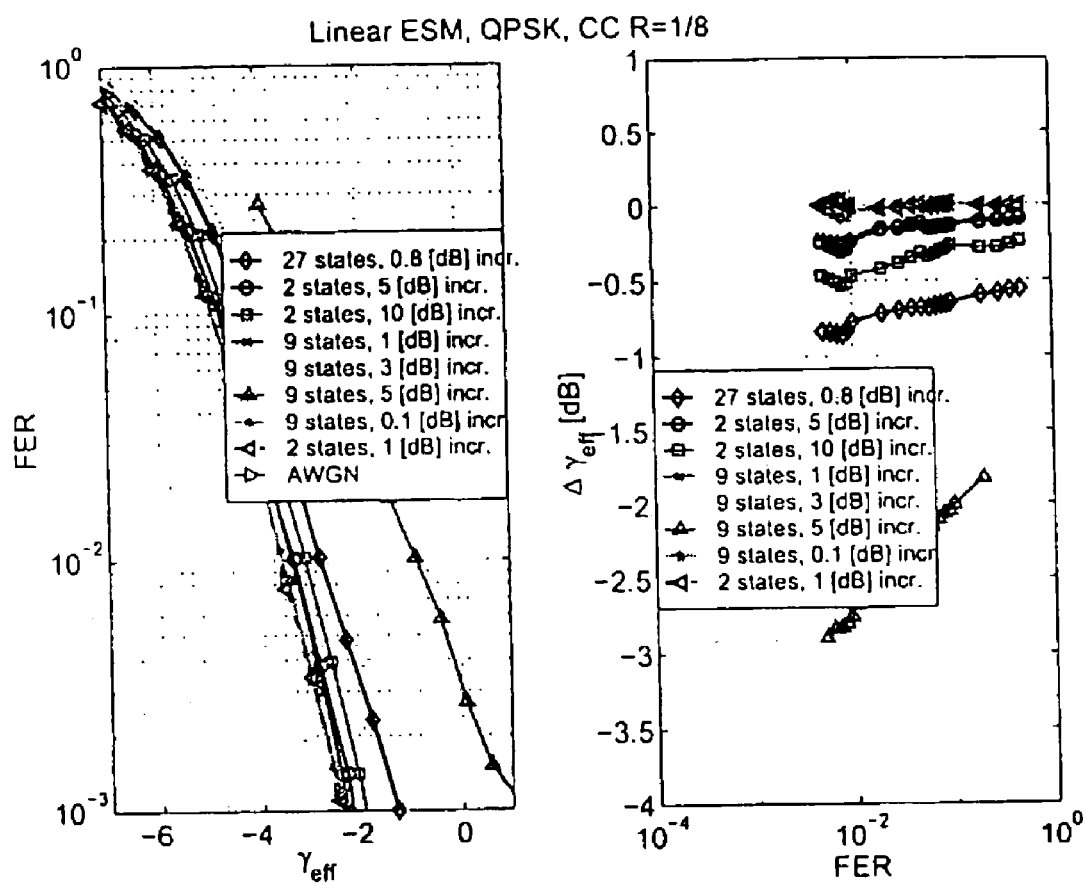

For MCS3 and MCS4 the simulation results for the linear ESM are shown in FIG. 22 and FIG. 23, respectively. For the code rate of R=1/2 it is significant that the linear ESM heavily overweights higher SNR values. Therefore, the error $\Delta\gamma_{eff}$ is negative (up to −20 dB). For lower code rates e.g. R=1/8 the linear ESM works better as could be expected from FIG. 5. In this case the overweighting of high SNR values plays a less significant role but still the error $\Delta\gamma_{eff}$ is up to −3 dB.

Figure 24:
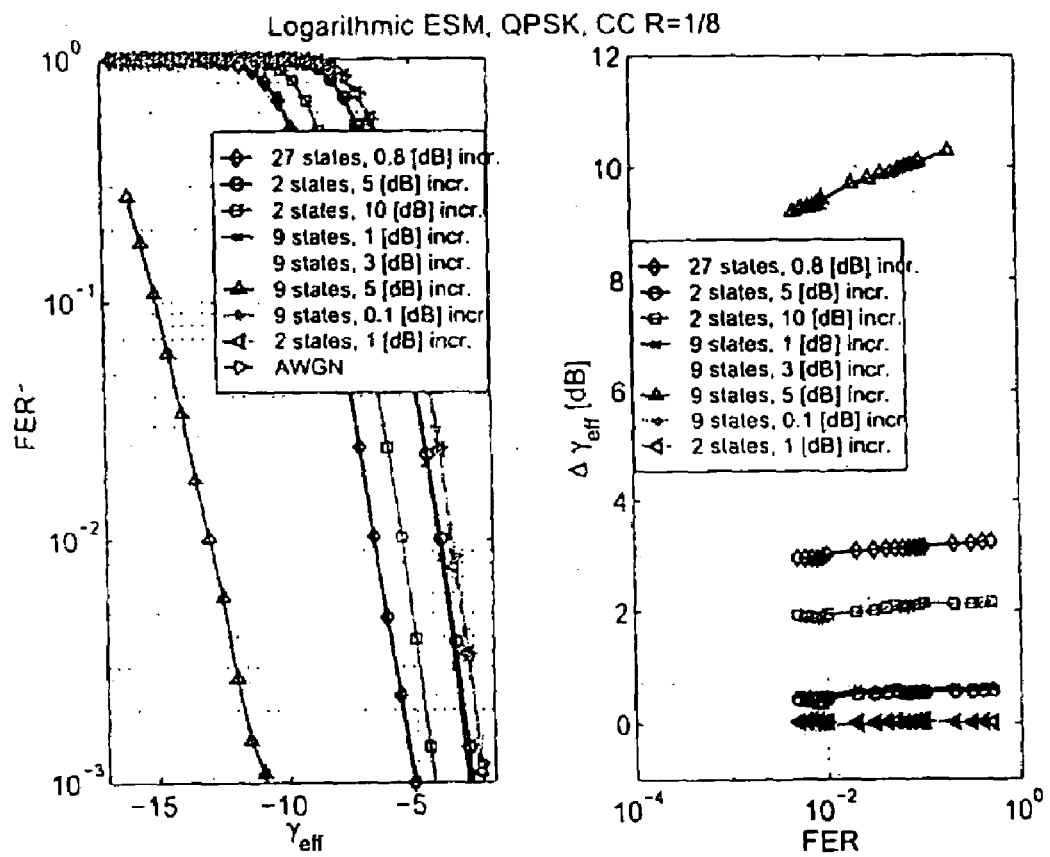
Figure 25:
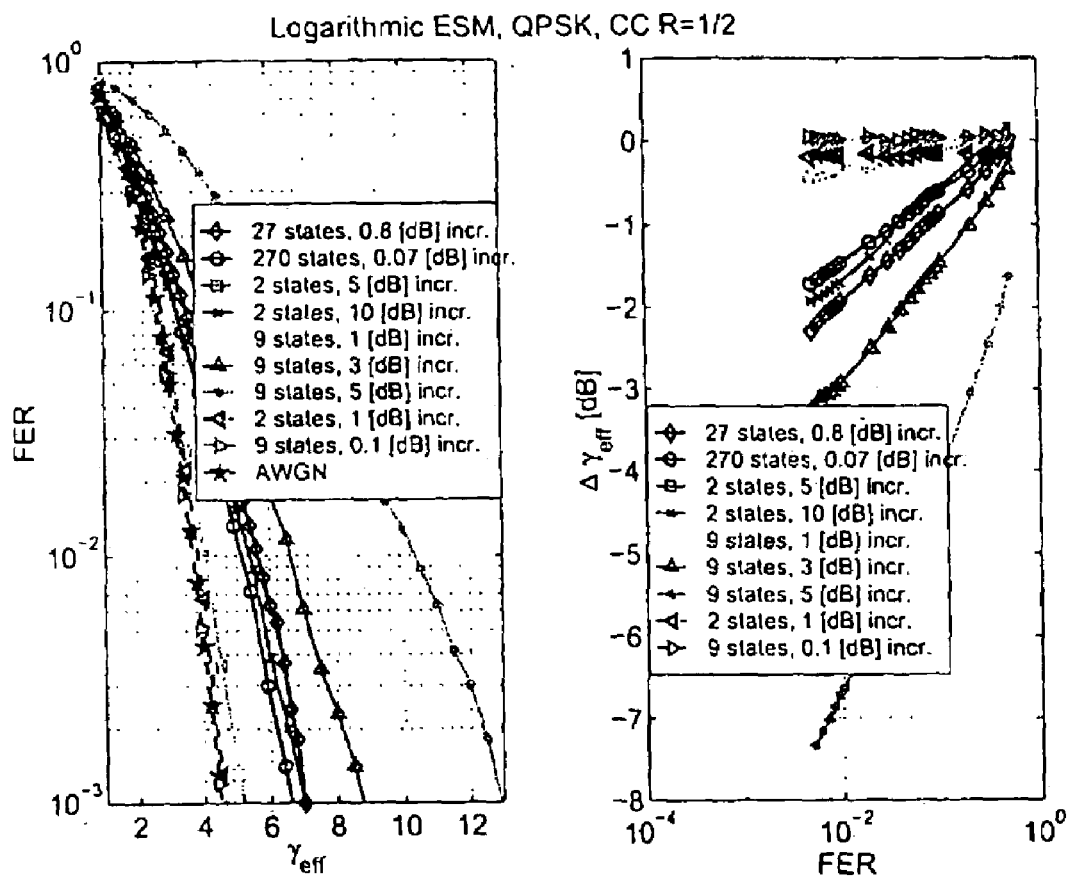

Furthermore, in FIG. 24 and FIG. 25 the simulation results for the logarithmic ESM are shown. For the code rate of R=1/2 it is significant that the logarithmic ESM overweights higher SNR values. Not to that extent as the linear ESM but still the error $\Delta\gamma_{eff}$ is negative (up to −7 dB). For lower code rates e.g. R=1/8 it becomes important that the logarithmic ESM weights low SNR values with a negative sign. This leads to the fact that the $\Delta\gamma_{eff}$ is positive. Again, the multi-state channel MS13 resulting in highly varying SNR values within one code word provides the highest error $\Delta\gamma_{eff}$ of up to 10 dB.

In the following discussion, various embodiments of the present invention are described.

In power controlled systems, such as UMTS and CDMA2000, which are based on CDMA, outer-loop power control is usually used to compensate inner-loop SNR target differences under different channel conditions, particularly Doppler spreads. For example, under conditions with low Doppler due to low velocity of the mobiles, the outer-loop power control (slow acting power control) adjusts the target SNR of the inner-loop power control (fast acting power control), if the resulting link quality parameter (e.g. BER, FER) deviates from the wanted one. If the channel conditions change, e.g. higher Doppler (higher velocity) or more frequency selectivity, the link quality parameter deviates again from the wanted one. In this case the outer-loop power control changes again the target SNR of the fast acting inner-loop power control to adjust the performance. This is necessary because in the standard a linear averaging of the channel quality values is performed, which results in inaccurate estimates of the link quality parameter and especially to estimations depending on the channel conditions.

Using embodiments of the present invention, which provides a possible means to translate a given channel condition to the equivalent static AWGN case. Therefore, embodiments of the present invention may be viewed as a unified measure for transmitted power and its corresponding link quality parameter (e.g. FER, BER) regardless of different channel conditions. As a result, outer-loop power control can be omitted in view of the accurate link quality determination provided by embodiments of the present invention in form of exponential ESM. Omitting outer-loop power control can result in a significant system gain, since the capacities previously used for outer-loop power control can now be utilized otherwise; for example, 1/8 rate voice null-frame could be used for other purposes.

In CDMA systems with power control the question arise what power should be allocated for the further transmissions.

In systems using the hybrid ARQ technique incremental redundancy (IR) embodiments of the present invention can be used to calculate the exact power allocation for further transmission within the IR scheme. IR is a hybrid ARQ technique. In IR a packet is sent first with a high code rate, in extreme cases not encoded. If the packet is received successfully, this condition is considered to be acceptable.

If the packet is not received successfully a second transmission is initiated. The content of the second transmission is redundant information to be exploited by the decoder in the receiver. That means, the decoder in the receiver combines the received signal from the first and the second transmission resulting in virtually higher code rate.

If the packet is decoded error free, no further actions in that regard are taken; otherwise, a further transmission is initiated with further redundant information, again reducing the code rate. This procedure is repeated in that manner until the packet is received successfully or a predicted threshold for the number of transmissions is exceeded.

In the following, with reference to FIG. 26, embodiments of transmitters and receivers, both thereof being adapted for communications in a wireless communications environment, are discussed.

Figure 26:
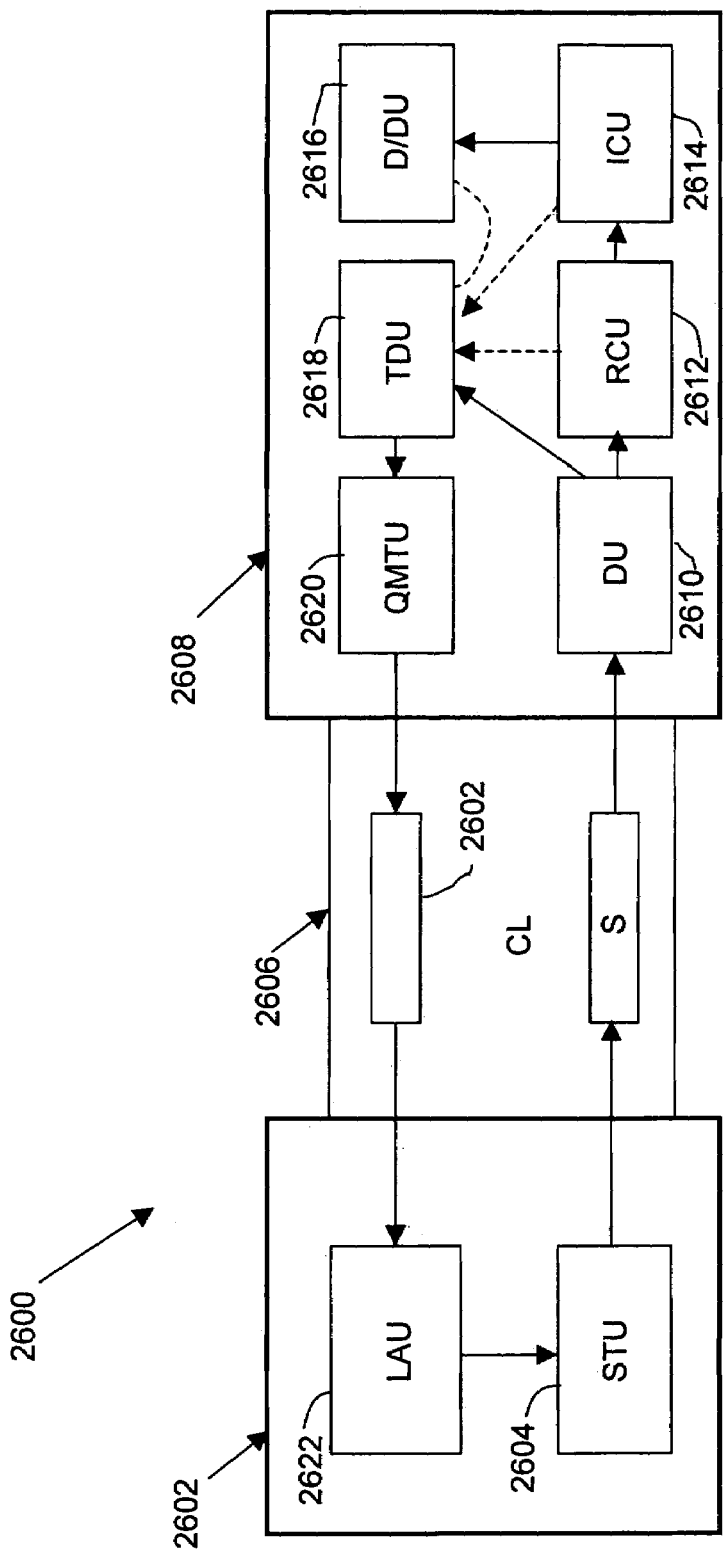
FIG. 26 is a block diagram showing an exemplary communications environment according to the invention.

As illustrated in FIG. 26, a signal S, which is transmitted from a transmitter 2602 by means of a signal transmission unit STU 2604 thereof via a wireless communications link CL 2606, is received by a receiver 2608. The received signal is demodulated by a demodulation unit DU 2610 of the receiver 2608 and forwarded for further signal processing, for example, to a RAKE combiner unit RCU 2612, an interference cancellation unit ICU 2614 and a deinterleaving/decoding unit D/DU 2616 of the receiver 2608.

In the illustrated embodiment, the exemplary method is carried out on the basis of signals outputted from the demodulation unit DU 2610. As indicated in FIG. 26 by the dotted lines, it is also possible to carry out embodiments of the exemplary method on the basis of signals outputted from the RAKE combiner unit RCU 2612, the interference cancellation unit ICU 2614 and the deinterleaving/decoding unit D/DU 2616.

By means of a transmission quality determination unit TDU 2618, the receiver 2608 determines the transmission quality of the received signal 2602 and generates a respective quality measure $\gamma_{eff}$ as discussed above. The thusly obtained quality measure $\gamma_{eff}$ is used to determine a link quality parameter, for example, a frame error rate FER and/or a bit error rate BER of the received signal 2602.

By means of a quality measure transmission unit QMTU 2620, the receiver 2608 communicates, via the communications link CL 2606, the quality measure $\gamma_{eff}$ or a link quality parameter derived therefrom.

Having received the quality measure $\gamma_{eff}$ or a parameter derived therefrom, the transmitter 2602 is enabled to perform a link adaptation as regards communications link CL 2606 by means of a link adaptation unit LAU 2622.

In case, the transmitter 2602 receives the quality measure $\gamma_{eff}$, the transmitter 2602 determines, for example by means of the link adaptation unit LAU, parameters indicating the link quality of communications link CL 2606 on the basis of the quality measure $\gamma_{eff}$. For example, the transmitter 2602 can determine the frame error rate FER and/or the bit error rate BER of the communications link 2606.

In case the transmitter 2602 receives, instead of the quality measure $\gamma_{eff}$, parameters derived therefrom indicating the link quality of the communications link CL 2606, the latter can be used for link adaptation.

On the basis of the quality measure $\gamma_{eff}$ or measures parameters derived therefrom, the transmitter 2602 performs, under control of the link adaptation unit, a link adaptation as regards communications link CL 2606, for example by controlling the signal transmission unit STU 2604 such that the signal power for signals to be transmitted via the communications link CL 2606 is varied and/or appropriate coding and modulation schemes are selected and/or signal power is allocated for subsequent transmissions.

Figure 27:
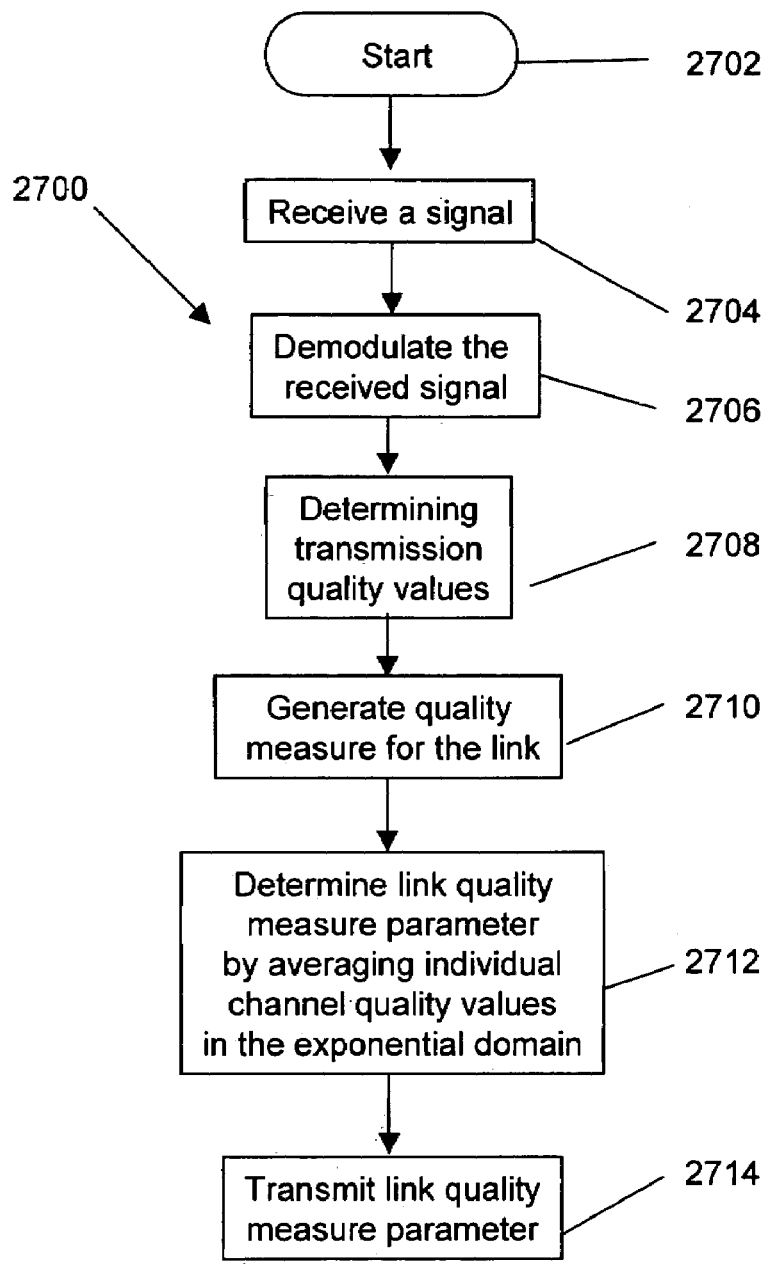
FIG. 27 is a flow chart illustrating an exemplary process used in one aspect of the present invention.

One embodiment of an exemplary process 2700 from the perspective of the receiver is illustrated in FIG. 27. The process 2700 begins at step 2702 and flows to step 2704 where the signal is received. In step 2706, the signal is demodulated. After demodulated, individual transmission quality values may be determined (step 2708). In step 2710, the quality measure of the link can be generated. For example, after the individual channel quality values for the different channel states have been determined, the quality measure can be determined by averaging the individual quality values as described previously. During averaging; the individual channel quality values may be weighted by individual probability measures. Once the quality measure of the link is determined, link quality measure parameters can be generated on the basis of the quality measure (step 2712). The link quality parameter may be determined in various ways. For instance, it may be determined from a look-up table associating quality measures with link quality parameters. Alternatively, the link quality parameter may be determined in a calculation routine used to derive the link quality parameter from the quality measure. In step 2714, the quality measure or a quality measure parameter may be transmitted back to the transmitter of the encoded signal. Thus, a control loop may be established, e.g. for link adaptation in dependence of the quality measure or the derived parameter.

Figure 28:
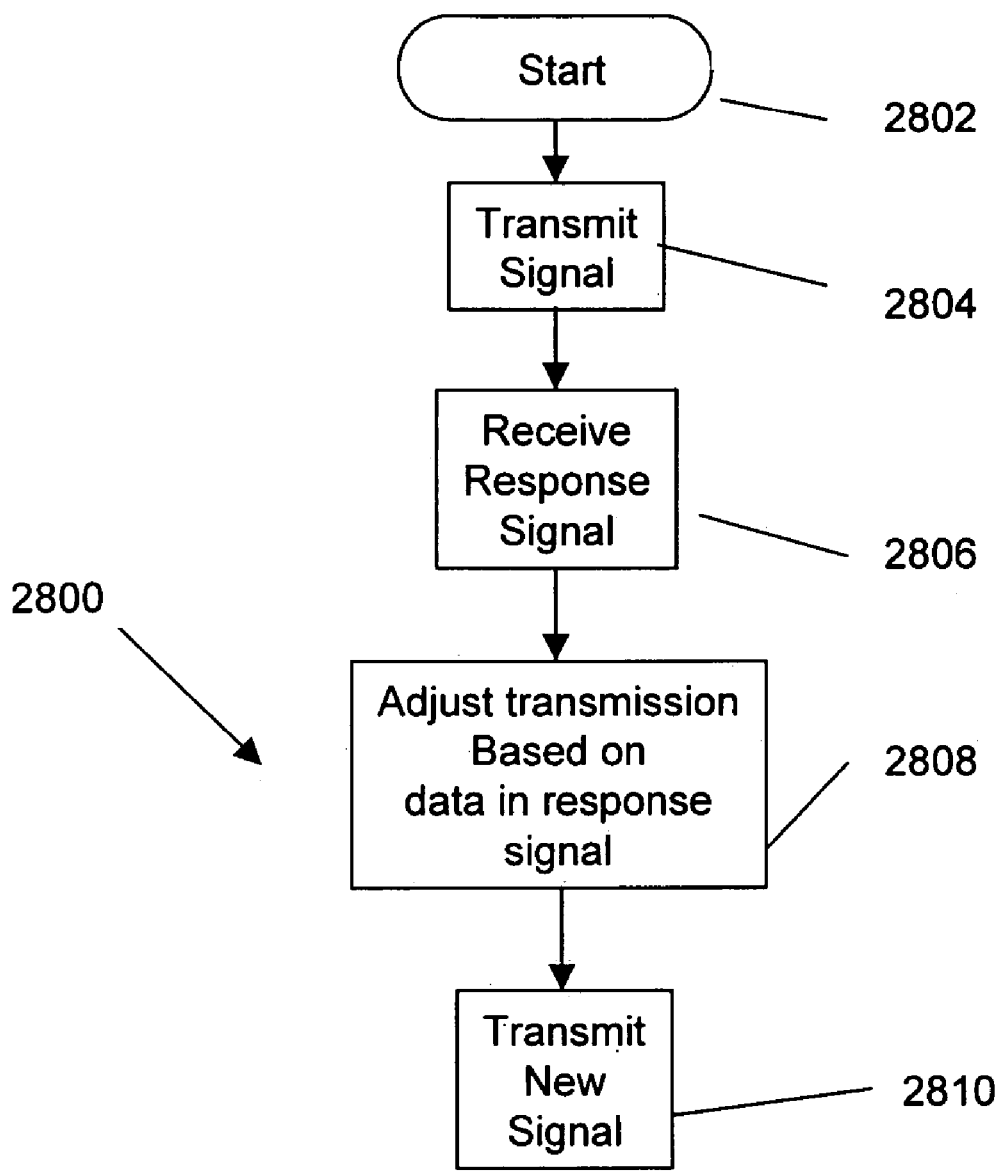
FIG. 28 is a flow chart illustrating an exemplary process used in one aspect of the present invention.

One embodiment of the exemplary process 2800 from the perspective of the transmitter is illustrated in FIG. 28. The process 2800 begins at step 2802 and flows to step 2804 where a signal is transmitted to a receiver (such as receiver 2608 of FIG. 26). In step 2806, a response signal is received. As previously described, the response signal contains either a quality measure $\gamma_{eff}$ of the link and/or a quality measure parameter. In step 2808, the transmitter then may make adjustments in the signal for the link such as, for example, adjusting the signal power for subsequent transmissions and/or selecting appropriate coding and modulation schemes to form a control loop. Thus, during link adaptation, the encoding scheme, the modulation scheme or the transmit power of signals to be transmitted via the communications link may be controlled. In step 2810, a new signal based on the link adaptation may then be transmitted.

Although embodiments of the method and device of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method of determining the quality of a wireless communications link on the basis of an encoded signal that is transmitted via the communications link and that includes at least two signal portions experiencing different states of one or more transmission channels, comprising:
   providing individual channel quality values ($\gamma_K$) for the different channel states, and
   determining a quality measure ($\gamma_{eff}$) indicative of the link quality by averaging the individual channel quality values ($\gamma_K$) in the exponential domain by applying an exponential function to each individual channel quality value ($\gamma_K$) and averaging the results thus obtained.

2. The method of claim 1, wherein a non-linear mean value function is applied to average the individual channel quality values ($\gamma_K$).

3. The method of claim 1, wherein each individual channel quality value ($\gamma_K$) is weighted by a probability measure ($p_k$) indicative of a probability for a signal portion experiencing the respective channel quality value ($\gamma_K$).

4. The method of claim 1, wherein the determination of the quality measure ($\gamma_{eff}$) is performed according to $$\gamma_{eff} = -\log_e\left(\sum_{k=1}^{N} p_k \exp(-\gamma_k \cdot \alpha)\right) \cdot \beta,$$

wherein, $\gamma_{eff}$ is the quality measure, $\gamma_K$ are the individual channel quality values, N is the number of signal portions included in the transmitted signal, $p_k$ are probability measures for individual channel quality values and $\alpha$ and $\beta$ are optional correction factors.

5. The method of claim 1, wherein at least one of the quality measure ($\gamma_{eff}$) and the individual channel quality values ($\gamma_K$) is adapted by at least one of a first correction term ($\gamma_{cod}$) associated with a particular coding scheme (MCS) used for transmitting the signal via the communications link, and a second correction term ($\gamma_{mod}$) associated with a particular modulation scheme used for transmitting the signal via the communications link.

6. The method of claim 5, wherein the first correction term ($\gamma_{cod}$) is chosen such that a deviation ($\Delta\gamma_{eff}$) of a reference quality measure ($\Delta_{eff}$) determined for a reference communications link from a measured quality measure ($\gamma_{eff}$) determined for an actual communications link is minimal for a target link quality parameter, wherein the target link quality parameter is a Frame Error Rate for the target ($FER_{tar}$) or a Bit Error Rate for the target ($BER_{tar}$).

7. The method of claim 1, wherein the quality measure ($\gamma_{eff}$) is determined according to $$\gamma_{eff} = -\log_e\left(\sum_{k=1}^{N} p_k \exp-\left(\frac{\gamma_k}{\gamma_{cod} * \gamma_{mod}}\right)\right) * \gamma_{cod} * \gamma_{mod},$$

wherein $\gamma_{eff}$ is the quality measure, $\gamma_K$ are the individual channel quality values, N is the number of signal portions included in the transmitted signal, $p_K$ are probability measures for individual channel quality values, $\gamma_{cod}$ is a first correction term associated with a particular coding format, and $\gamma_{mod}$ is a second correction term associated with a particular modulation scheme.

8. The method of claim 1, further comprising determining a link quality parameter for the communications link on the basis of the individual channel quality values ($\gamma_K$), wherein the link quality parameter is a Frame Error Rate (FER) or a Bit Error Rate (BER).

9. The method of claim 8, wherein the link quality parameter is determined from a look-up table associating predetermined quality measures with link quality parameters.

10. The method of claim 1, further comprising transmitting the quality measure ($\gamma_{eff}$) or a parameter derived therefrom back to a transmitter of the encoded signal.

11. The method of claim 1, further comprising adapting the communications link in dependence of the quality measure ($\gamma_{eff}$) or a parameter derived therefrom.

12. The method of claim 11, wherein adapting the communications link includes controlling the transmit power of signals to be transmitted via the communications link.

13. The method of claim 11, wherein adapting the communications link includes adapting at least one of a coding scheme and a modulation scheme.

14. The method of claim 11, wherein adapting the communications link includes an inner-loop power control that is based on the quality measure ($\gamma_{eff}$) or the parameter derived therefrom omitting an outer-loop power control for controlling a setpoint of the inner-loop power control.

15. The method of claim 1, wherein the quality measure ($\gamma_{eff}$) or a parameter derived therefrom is used in context with allocating a transmit power to signal re-transmissions that are performed according to an incremental redundancy technique.

16. The method of claim 1, further comprising completely or partially replacing transmission resources currently in use if the quality measure satisfies a predefined condition.

17. The method of claim 1, further comprising completely or partially replacing transmission resources currently in use if a parameter derived from the quality measure satisfies a predefined condition.

18. The method of claim 1, wherein the individual channel quality values ($\gamma_K$) are obtained for symbols of a code word transmitted by means of the signal.

19. The method of claim 17, wherein the symbols are Orthogonal Frequency Division Multiplexing (OFDM) symbols or parts thereof.

20. The method of claim 1, wherein the individual channel quality values ($\gamma_K$) are indicative of signal-to-noise ratios (SNR) or signal-to-interference ratios (SIR).

21. A receiver with a functionality for determining the quality of a wireless communications link that includes one or more transmission channels with at least two different states, comprising:

a means for providing individual channel quality values ($\gamma_K$) for the different states, and a means for determining a quality measure ($\gamma_{eff}$) indicative of the link quality by averaging the transmission quality values ($\gamma_K$) in the exponential domain by applying an exponential function to each individual channel quality value ($\gamma_K$) and averaging the results thus obtained.

22. The receiver of claim 21, further comprising a unit for generating a signal that includes the quality measure ($\gamma_{eff}$) or a parameter derived therefrom and that is to be transmitted to a transmitter of the signal.

23. A system for communications via wireless communications links, comprising:

a receiver having a means for determining the quality of a wireless communications link that includes one or more transmission channels with at least two different states, including:

a means for providing individual channel quality values ($\gamma_K$) for the different states, and a means for determining a quality measure ($\gamma_{eff}$) indicative of the link quality by averaging the transmission quality values ($\gamma_K$) in the exponential domain by applying an exponential function to each individual channel quality value ($\gamma_K$) and averaging the results thus obtained, and a controller for adapting the communications link according to the quality measure ($\gamma_{eff}$) or a parameter derived therefrom.

24. The communications system of claim 23, wherein the controller is configured to implement a power control scheme and further comprising a single power control loop which is based on a comparison of the quality measure ($\gamma_{eff}$) or a parameter derived therefrom with a static target value.

25. The communications system of claim 23, wherein the controller is configured to adapt the communications link on the basis of an estimation of an average signal power for encoded signals to be transmitted via the communications link.

26. The communications system of claim 23, wherein the controller is configured to select transmission resources completely or partially replacing the current transmission resources if the quality measure or a parameter derived therefrom satisfies a predefined condition.

\* \* \* \* \*

UNITED STATES PATENT AND TRADEMARK OFFICE
CERTIFICATE OF CORRECTION

PATENT NO. : 7,231,183 B2
APPLICATION NO. : 10/682280
DATED : June 12, 2007
INVENTOR(S) : Pauli et al.

It is certified that error appears in the above-identified patent and that said Letters Patent is hereby corrected as shown below:

In Column 3, Line 44, delete "$\gamma_{eff} = -loge$" and insert -- $\gamma_{eff} = -log_e$ --, therefor.

In Column 4, Line 11, delete "$\gamma_{eff} = -loge$" and insert -- $\gamma_{eff} = -log_e$ --, therefor.

In Column 8, Lines 53-55, in Equation (2.1), delete "$P_e\left(\frac{E_S}{N_0}\right) \leq \sum_{d=d_{min}}^{\infty} a_d P_2\left(d, \frac{E_S}{N_0}\right)$" and insert -- $P_e\left(\frac{E_S}{N_0}\right) \leq \sum_{d=d_{min}}^{\infty} a_d P_2\left(d, \frac{E_S}{N_0}\right)$ --, therefor.

In Column 10, Line 59, after "goal", delete ",".

In Column 11, Line 63, delete "P (Y I X, $\gamma_k$)" and insert -- P (Y | X, $\gamma_k$) --, therefor.

In Column 13, Line 64, after "and", delete ",".

In Column 15, Line 51, delete "$\Delta_{eff}$" and insert -- $\gamma_{eff}$ --, therefor.

In Column 18, Line 9, after "averaging" delete ";" and insert -- , --, therefor.

In Column 18, Line 60, in Claim 1, delete "($\gamma_K$)" and insert -- ($\gamma_k$) --, therefor.

Signed and Sealed this

Sixteenth Day of March, 2010

David J. Kappos
*Director of the United States Patent and Trademark Office*